(12) United States Patent
Nakamura

(10) Patent No.: US 6,888,041 B1
(45) Date of Patent: May 3, 2005

(54) DECOMPOSITION APPARATUS OF ORGANIC COMPOUND, DECOMPOSITION METHOD THEREOF, EXCIMER UV LAMP AND EXCIMER EMISSION APPARATUS

(75) Inventor: Masaru Nakamura, Chigasaki (JP)

(73) Assignees: Quark Systems Co., Ltd. (JP); M. Watanabe & Co., Ltd. (JP)

( * ) Notice: Subject to any disclaimer, the term of this patent is extended or adjusted under 35 U.S.C. 154(b) by 124 days.

(21) Appl. No.: 09/695,043

(22) Filed: Oct. 25, 2000

Related U.S. Application Data

(62) Division of application No. 09/132,215, filed on Aug. 11, 1998, now Pat. No. 6,194,821.

(30) Foreign Application Priority Data

| Feb. 12, 1997 | (JP) | ............................................. P9-28071 |
| Dec. 26, 1997 | (JP) | ............................................ P9-360940 |
| May 11, 1998 | (JP) | ........................................ P10-127195 |
| May 19, 1998 | (JP) | ........................................ P10-136229 |

(51) Int. Cl.⁷ ................................................. B01J 19/08
(52) U.S. Cl. ........................................ 588/227; 204/164

(58) Field of Search ........................... 588/227; 204/164

(56) References Cited

U.S. PATENT DOCUMENTS

| 4,096,450 A | 6/1978 | Hill et al. ................. 331/94.58 |
| 4,780,287 A | * 10/1988 | Zeff et al. ................. 422/186.3 |
| 4,837,484 A | 6/1989 | Eliasson et al. ............. 313/634 |
| 5,955,840 A | 9/1999 | Arnold et al. ............... 313/637 |

* cited by examiner

*Primary Examiner*—Kishor Mayekar
(74) *Attorney, Agent, or Firm*—Nixon & Vanderhye PC

(57) ABSTRACT

A decomposition apparatus is provided that includes an excimer lamp emitting UV light for decomposing an organic compound and a decomposition container provided with the excimer lamp for decomposing the organic compound in a liquid or a gas. In the decomposition apparatus, since the UV light irradiated from the excimer lamp is emitted to the liquid or the gas, the organic compound in the liquid or the gas can be decomposed easily by the simple decomposition apparatus and method. The decomposition apparatus and method are effective to decompose the organic compound, such as dioxin (polychlorinated dibenzo-para-dioxin), PCB (polychlorinated biphenyl), trichloroethylene or the like, polluting the air or water to purify the environment.

6 Claims, 24 Drawing Sheets

DECOMPOSITION APPARATUS OF ORGANIC COMPOUND, DECOMPOSITION METHOD THEREOF, EXCIMER UV LAMP AND EXCIMER EMISSION APPARATUS

This is a divisional of application Ser. No. 09/132,215, filed Aug. 11, 1998, now U.S. Pat. No. 6,194,821, the entire content of which is hereby incorporated by reference in this application.

BACKGROUND OF THE INVENTION

The present invention relates to a decomposition apparatus of an organic compound by emission of an ultraviolet (LV) light which is irradiated from an excimer lamp, a decomposition method thereof and an excimer lamp and an excimer emission apparatus which may suitable be used for the decomposition apparatus and the decomposition method.

An organic compound causing air pollution or water pollution can be decomposed or eliminated by an activated carbon adsorption treatment, an oxidation decomposition treatment, an activated sludge treatment, a bio-oxidation treatment or the like. Among the treatments described above, the activated carbon adsorption treatment may suitable be used for the elimination of the organic compound causing water pollution.

As the problem of the activated carbon adsorption treatment, a high-priced activated carbon is generally used and therefore the activated carbon makes it necessary to recycle; a handling of the activated carbon is not easy since the activated carbon is of powdery; an apparatus of the activated carbon adsorption treatment is of comparatively large scale; a recycling treatment of the activated carbon and maintenance of the apparatus need much labors and costs.

Recently, we are in dilemma how to solve the problem described above. Therefore, a method and an apparatus for decomposing easily the organic compound causing air pollution or water pollution at a low cost is requested.

SUMMARY OF THE INVENTION

The present invention was made in view of the above-mentioned circumstances. An object of the present invention is therefore to provide a decomposition apparatus by emission of a UV light which is irradiated from an excimer lamp, a decomposition method thereof and an excimer lamp and an excimer emission apparatus which may suitable be used for a decomposition apparatus and a decomposition method of an organic compound.

For the purpose of attainment of the above-mentioned object of the present invention, a decomposition apparatus for decomposing an organic compound fluid such as a gas of an organic compound, a liquid thereof, a gas containing an organic compound and a liquid containing an organic compound is decomposed. The decomposition apparatus comprises an excimer lamp emitting UV light for decomposing the organic compound, a decomposition container provided with an excimer lamp for decomposing the organic compound in the organic compound fluid. In the decomposition apparatus of the present invention, two or more decomposition container each having the excimer lamp may be jointed for flowing the fluid in the container to other container in order, and the organic compound in the fluid can be effectively decomposed. In case of the above-mentioned apparatus, it is preferable that the container is provided with a flow rate buffering material for slowing down a flow rate of the fluid. It is preferable that a contact part between the fluid and a catalyst gas for promoting decomposition of the organic compound is equipped to the decomposition container. The excimer lamp, which may suitable be used for the decomposition apparatus, comprises a discharging vessel made of a dielectric material with excellent permeability of a UV light, an inner tube equipped on the inside of the discharging vessel, a protect tube equipped on the outside of the discharging vessel, an outer electrode equipped in the position between the protect tube and the discharging vessel, an inner electrode equipped on the inside of the inner tube, a filling gas filled up in the discharging vessel and a power supply for applying a voltage between the outer electrode and the inner electrode.

A decomposition apparatus for decomposing an organic compound in second mode of the present invention comprises an excimer emission body equipped with an inner electrode, a metal container equipped to the outside of the excimer emission body for filling up at least one selected from a liquid of an organic compound and a liquid containing organic compound, and a power supply for applying a high frequency voltage between the inner electrode and the metal container, and a UV light irradiated from the excimer emission body to the liquid in the metal container allows to generate OH radical and O radical into the liquid, and the radical cuts some bond of the organic compound so that the organic compound in the liquid is decomposed easily. It is preferable that the excimer emission body comprises a discharging vessel made of a dielectric material with excellent permeability of a UV light, an inner tube equipped on the inside of the discharging vessel, an inner electrode equipped on the inside of the inner tube and a filling gas filled up in the discharging vessel. It is preferable that the power supply applies a high frequency voltage from 1 to 20 MHz to the metal container and the inner electrode.

The organic compound used may be selected from flon, dioxin (polychlorinated dibenzo-para-dioxin), PCB (polychlorinated biphenyl), trichloroethylene, tetrachloroethylene, dichloromethane, tetrachloromethane, 1,2-dichloroethane, 1,1-dichloroethane, cis-1,2-dichloroethane, 1,1,1-trichloroethane, 1,3-dichloropropene and the mixture thereof. It is preferable that the UV light of wavelength of 222 nm or below may suitable be used.

A decomposition method for decomposing an organic compound of the present invention may be used in the decomposition apparatus described above, and comprises steps of flowing a fluid which is selected from a gas of an organic compound, a liquid thereof, a gas containing an organic compound and a liquid containing an organic compound during the emission of a UV light which is irradiated from the excimer lamp, and decomposing the organic compound in fluid during its flowing. In this case, it is preferable that the fluid flows slowly in a flow rate buffering material during the emission of UV light. And, it is preferable that the fluid contacts a catalyst for promoting the decomposition of an organic compound during the emission of UV light. The organic compound used may be selected from flon, dioxin (polychlorinated dibenzo-para-dioxin), PCB (polychlorinated biphenyl), trichloroethylene, tetrachloroethylene, dichloromethane, tetrachloromethane, 1,2-dichloroethane, 1,1-dichloroethane, cis-1,2-dichloroethane, 1,1,1-trichloroethane, 1,3-dichloropropene and the mixture thereof. It is preferable that the UV light of wave length of 222 nm or below may suitable be used.

An excimer lamp, which may suitable be used for the decomposition apparatus and the decomposition method described above, comprises a discharging vessel made of a dielectric material with excellent permeability of UV light, an inner tube equipped on the inside of the discharging vessel, an outer electrode equipped on the outside of the discharging vessel, an inner electrode equipped on the inside of the inner tube and a filling gas filled up in the discharging vessel, and a UV light is preferably irradiated from the excimer lamp by which a high frequency voltage is applied between the outer electrode and the inner electrode from 1 to 20 MHz. In this case, it is preferable that the inner tube is cooled by a nitrogen gas flowed in the inner tube. It is preferable that d/D ratio, in which the "d" is an inner diameter of the inner tube and the "D" is an outer diameter of the inner electrode, is of from 1.1 to 3.0, and that L/D ratio, in which the "L" is a length of the inner electrode and the "D" is an outer diameter of the inner electrode, is of from 10 to below 30.

An U-shaped inner tube of at least one or above, as the inner tube, may be equipped on the inside of the discharging vessel.

An excimer emission apparatus comprises the excimer lamp described above, a power supply for applying a high frequency voltage from 1 to 20 MHz between the outer electrode and the inner electrode and a circulating cooling apparatus by the nitrogen gas to cool the inner tube. In this case, it is preferable that d/D ratio, in which the "d" is an inner diameter of the inner tube and the "D" is an outer diameter of the inner electrode, is of from 1.1 to 3.0, and that L/D ratio, in which the "L" is a length of the inner electrode and the "D" is an outer diameter of the inner electrode, is of from 10 to below 30.

BRIEF DESCRIPTION OF THE DRAWINGS

FIG. 8 shows a schematic view illustrating a sixth embodiment of a decomposition apparatus (F) of the present invention in.

DESCRIPTION OF THE PREFERRED EMBODIMENTS

The present invention will now be explained with reference to figures.

Figure 1:
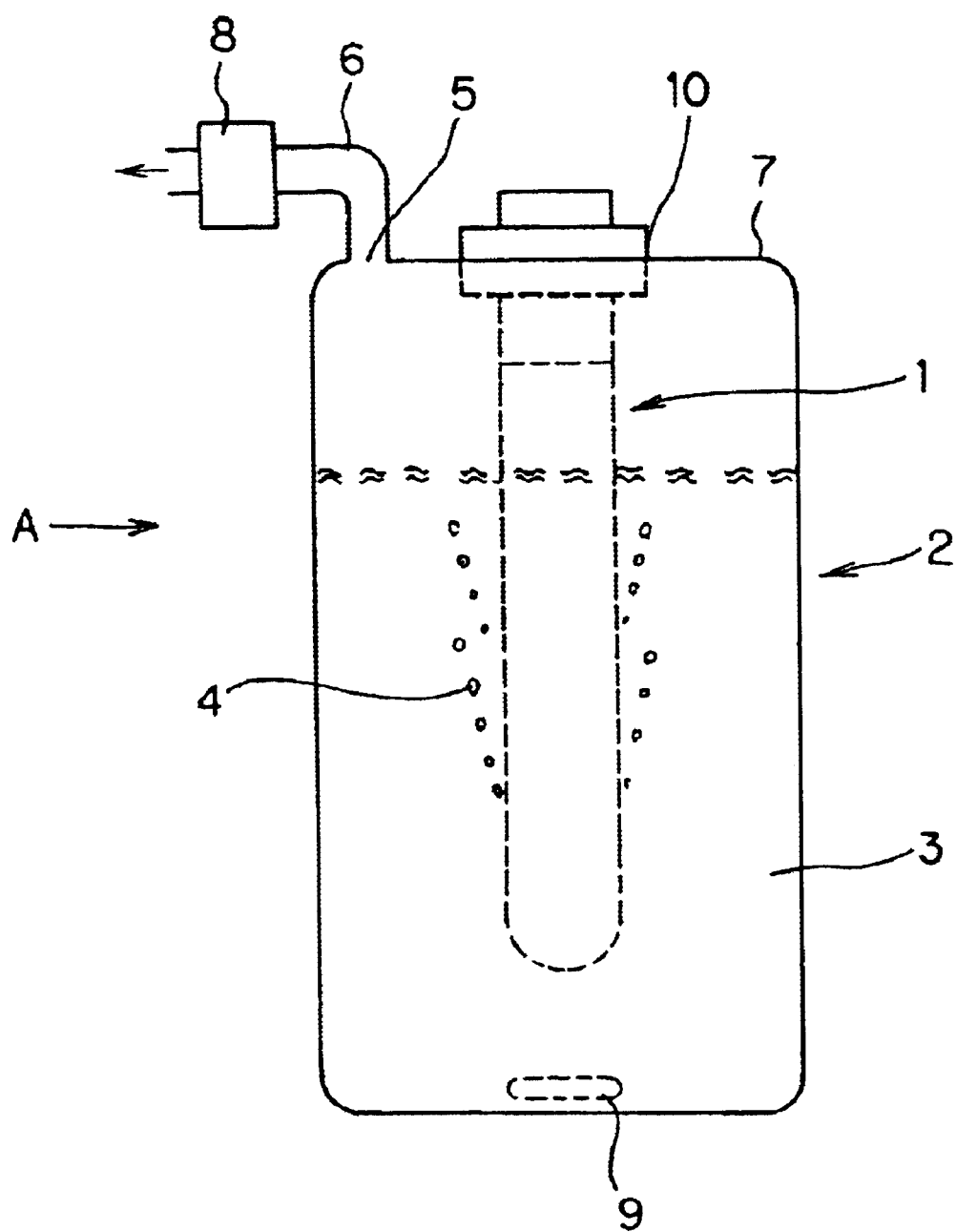
FIG. 1 shows a schematic view illustrating a first embodiment of a decomposition apparatus (A) of the present invention.

A decomposition apparatus for decomposing an organic compound in first mode of the present invention will be explained. FIG. 1 shows a schematic view illustrating a first embodiment of a decomposition apparatus of the present invention. In FIG. 1, the decomposition apparatus A comprises an excimer lamp 1 and a decomposition container 2. The excimer lamp 1 is equipped to the decomposition container 2 to immerse in a liquid 3 of at least one selected from a liquid of an organic compound and a liquid containing an organic compound. The organic compound in liquid 3 is decomposed by emission of UV light irradiated from the excimer lamp 1.

The organic compound may suitable be selected from flon, dioxin (polychlorinated dibenzo-para-dioxin), PCB (polychlorinated biphenyl), trichloroethylene, tetrachloroethylene, dichloromethane, tetrachloromethane, 1,2-dichloroethane, 1,1-dichloroethane, cis-1,2-dichloroethane, 1,1,1-trichloroethane, 1,3-dichloropropene and the mixture thereof. All of the organic compound described above pollutes air or water and has a strong bond between carbon and chlorine. However, the organic compound in the liquid 3 can be decomposed easily by emission of the UV light irradiated from the excimer lamp 1 according to the present invention. The decomposition apparatus can decompose an organic halogen compound containing halogens element such as fluorine element or bromine element besides the organic compound described above.

The form of the container 2 is not limited to that of the container 2 in FIG. 1. It is preferable to use the container 2 in which the material thereof is unreactive to the liquid 3 and the UV light irradiated from the excimer lamp 1 for example stainless steel or the like. The container 2 may be provided with an attachment hole 10 of the excimer lamp 1, an exhaust hole 5 of a decomposed gas 4 and an exhaust tube with carbon filter to exhaust gas. The container 2 may be provided with a mixer which is a stirrer with a stirrer chip 9 or a propeller mixer, to decompose efficiently.

Figure 2:
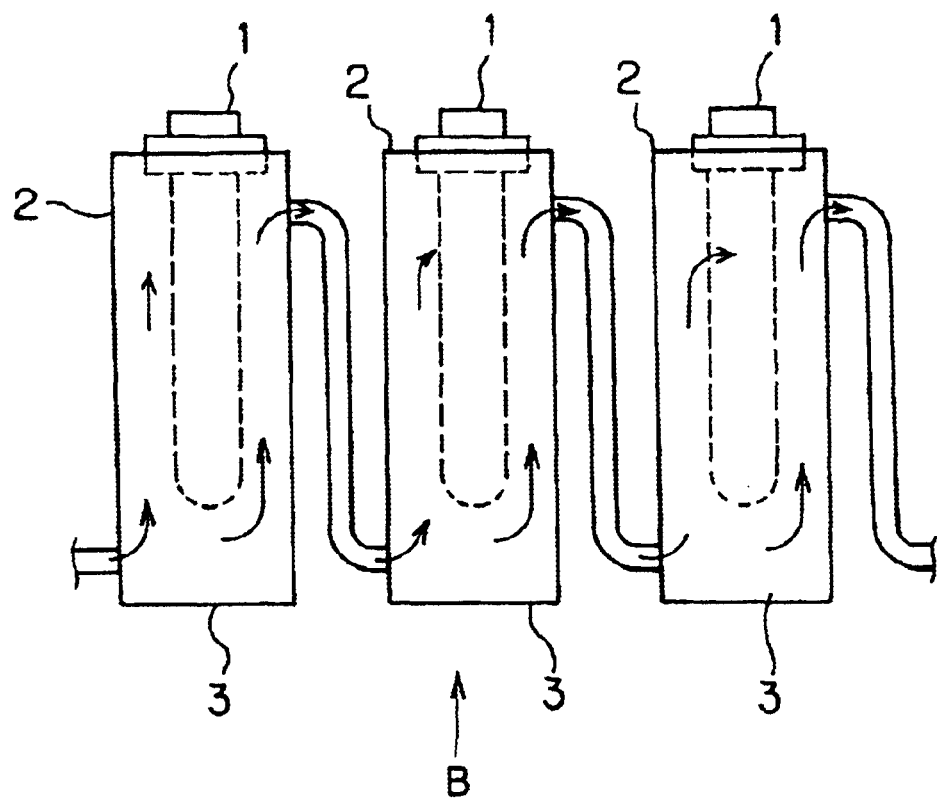
FIG. 2 shows a schematic view illustrating a second embodiment of a decomposition apparatus (B) of the present invention.

FIG. 2 shows a schematic view illustrating a second embodiment of a decomposition apparatus (B) of the present invention. In the decomposition apparatus B as shown in FIG. 2, two or more containers 2 each having the excimer lamp 1 may be joints for flowing the fluid in one container to the other container in order. In the decomposition apparatus B, the liquid 3 is emitted by light irradiated from the excimer lamp 1 during flowing in the container 2 so that the organic compound in the liquid 3 is decomposed continuously and efficiently. According to the decomposition apparatus (B), the efficiency of decomposition and the quantity of decomposition treatment of the organic compound can be improved.

Figure 3:
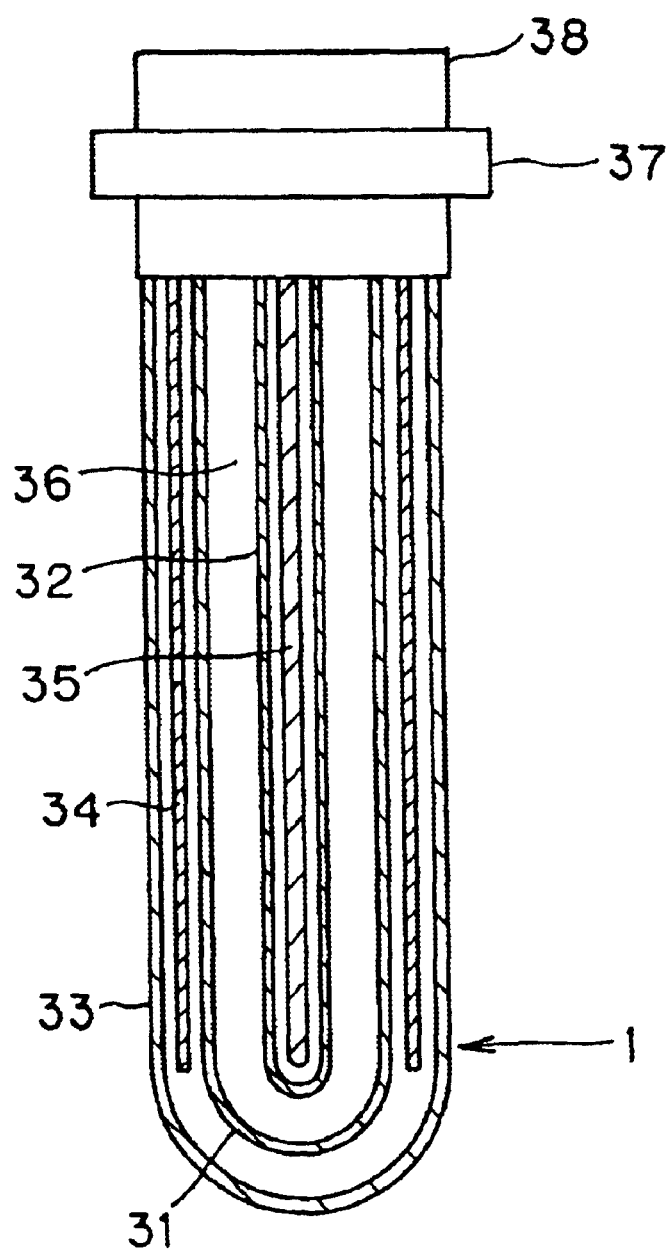
FIG. 3 shows a schematic longitudinal cross sectional view illustrating an embodiment of an excimer lamp used for the decomposition apparatus of the present invention.

FIG. 3 shows a schematic longitudinal cross sectional view illustrating an embodiment of an excimer lamp used for the decomposition apparatus of the present invention. As shown in FIG. 1 and FIG. 2, the excimer lamp 1 is equipped to the container 2 to immerse in the liquid 3. The excimer lamp 1 comprises a discharging vessel made of a dielectric material with excellent permeability of UV light, an inner tube equipped on the inside of the discharging vessel, an outer electrode equipped on the outside of the discharging vessel, an inner electrode equipped on the inside of the inner tube and a filling gas filled up in the discharging vessel, and a UV light is preferably irradiated from the excimer lamp 1 by which a high frequency voltage is applied between the outer electrode and the inner electrode from 1 to 20 MHz. A power supply (no illustrating in figures) for applying a voltage of the high frequency between the outer electrode 34 and the inner electrode 35 of the excimer lamp 1, is equipped to the decomposition apparatus. The irradiated UV light is emitted in all directions from a surface of the excimer lamp 1 by the applying voltage. The detail of constitution of the excimer lamp 1 will be explained afterwards. The excimer lamp 1 may be provided with a supporting member 38 comprising a attachment member 37 for fitting the excimer lamp 1 to the container 2. The excimer lamp 1 may be attached anywhere and may be possible to desorb.

The excimer lamp 1 can irradiate the UV light of the different wavelength such as 172 nm, 222 nm and 308 nm based on a kind of the filling gas. To the decomposition of the organic compound, it is preferable to emit the UV light of wavelength of 222 nm or below, for example 172 nm and 222 nm, to the organic compound. By the emission of UV light of wavelength of 222 nm or below, many exited oxygen atom is generated directly from oxygen in the liquid or air and have a strong oxidation force. Furthermore, since the UV light has the strong photon energy, a bond such as C—C, C—O, C—H and C—Cl of the organic compound is cut easily, the organic compound is decomposed by which the exited oxygen atoms attacks the position of the bond so that a decomposed material such as $CO_2$, $H_2O$ or the like is generated. In FIG. 1, the decomposed material is released from the liquid 3 as the decomposition gas 4 and is exhausted through the exhaust tube 5 of the container 2.

Figure 4:
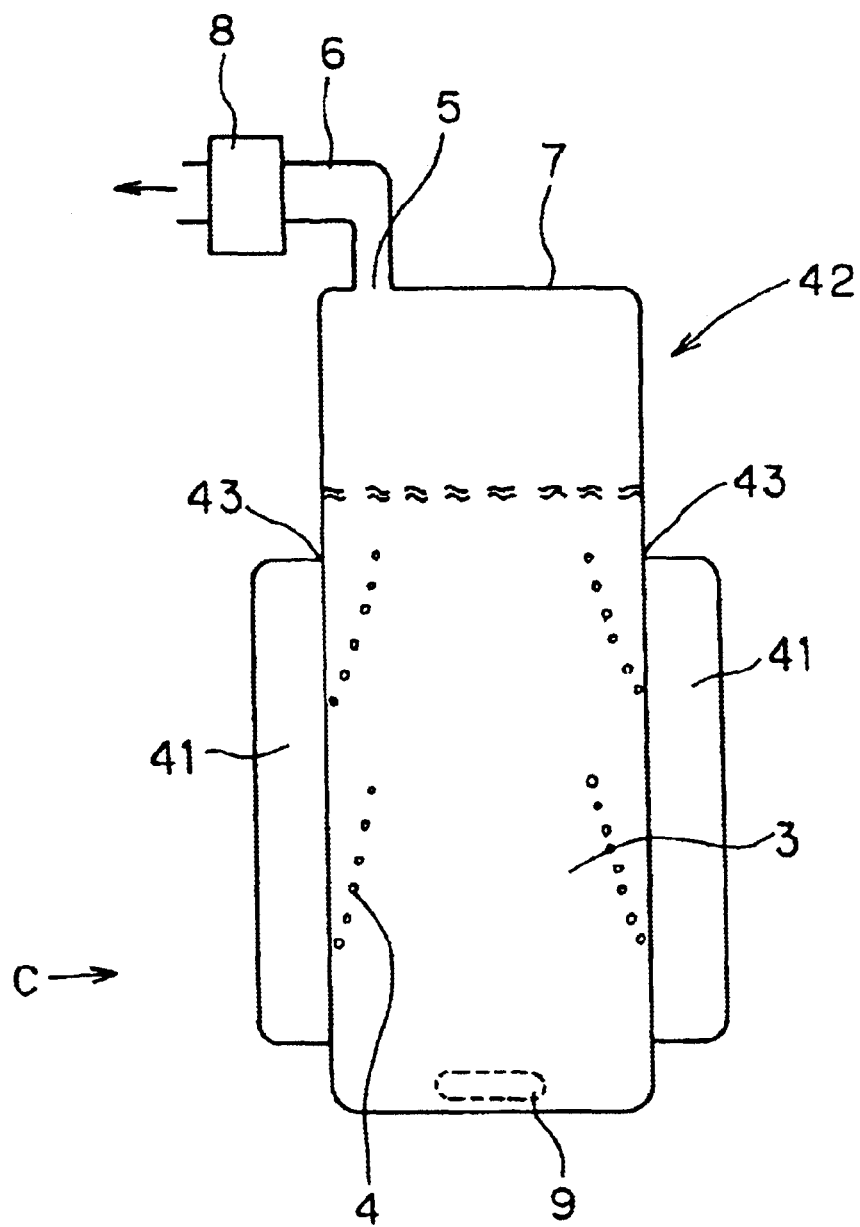
FIG. 4 shows a schematic view illustrating a third embodiment of a decomposition apparatus (C) of the present invention.
Figure 5:
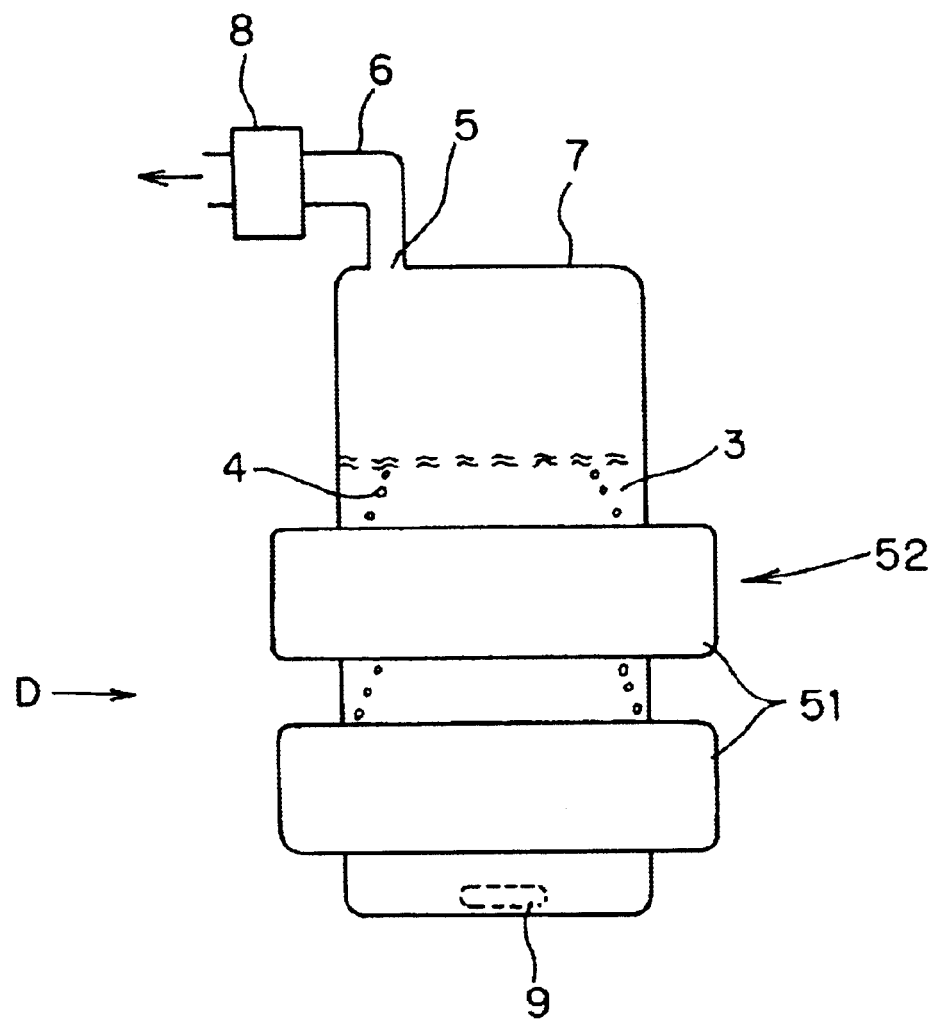
FIG. 5 shows a schematic view illustrating a fourth embodiment of a decomposition apparatus (D) of the present invention attached the excimer lamp.

FIG. 4 and FIG. 5 show a schematic view illustrating third and fourth embodiments of a decomposition apparatus C, D equipped with the excimer lamp unit 41, 51, which has excimer lamp, for emitting the liquid 3 into the container 42, 52. In FIG. 4 and FIG. 5, the excimer lamp unit 41, 51 of at least one or above are equipped on the sides of the containers 42, 52.

Figure 6:
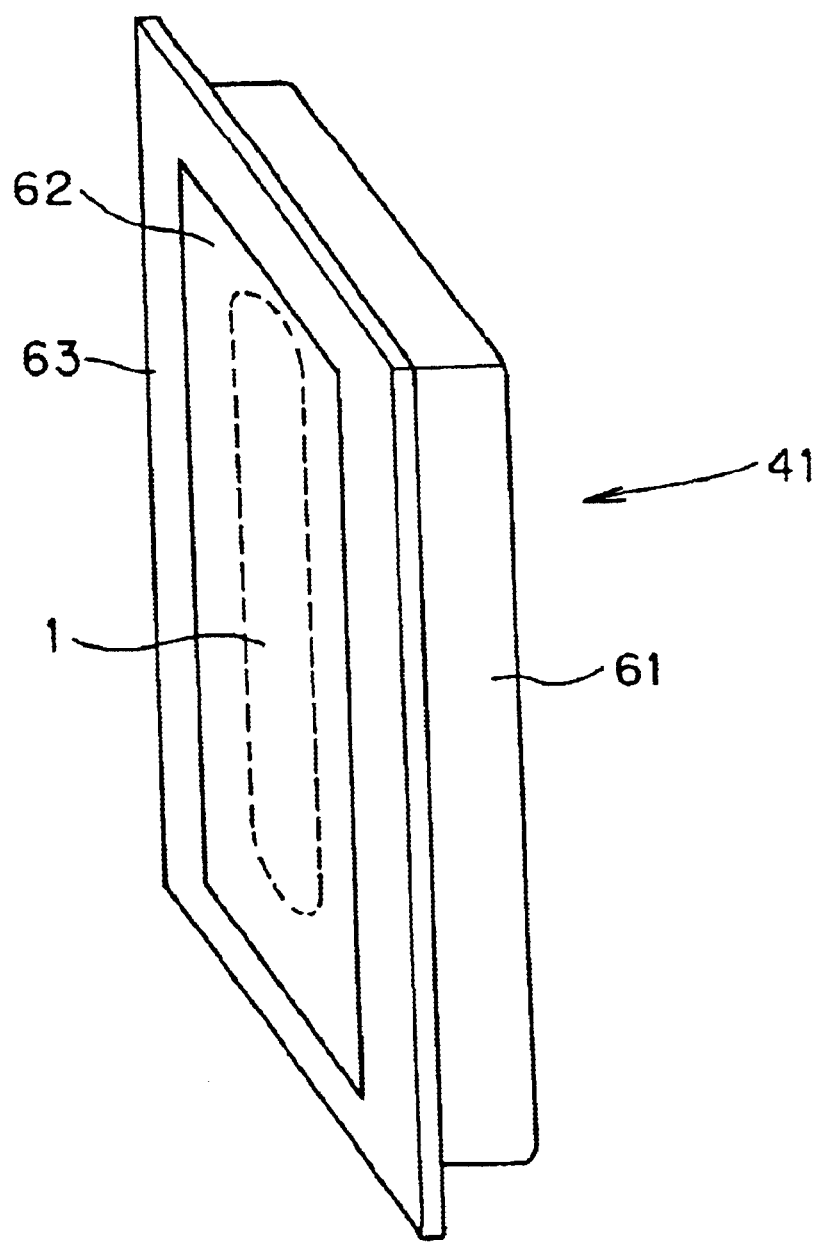
FIG. 6 shows a schematic perspective view illustrating an embodiment of an excimer lamp used for the decomposition apparatus (C) in FIG. 4.

FIG. 6 shows a schematic perspective view illustrating an embodiment of an excimer lamp unit 41 used for the decomposition apparatus C in FIG. 4. The excimer lamp unit 41 has the excimer lamp 1 in a protect box 61 with one open window 62 and can be attached to the position 43 of the container 42 by an attachment member 63. According to the decomposition apparatus, the organic compound in the liquid 3 is decomposed by emission of the UV light irradiated from the excimer lamp 1.

As shown in the decomposition apparatus D of FIG. 5, at least one ring-shape excimer lamp unit 51 is equipped to the cylinderic container 52.

Figure 7:
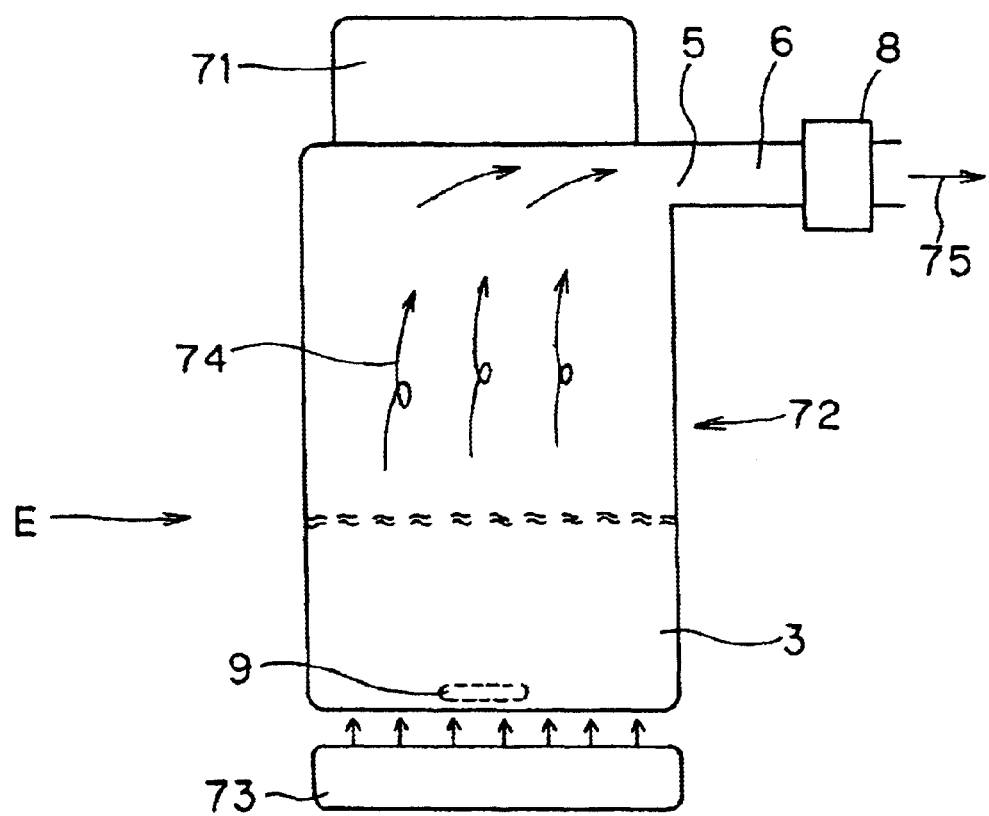
FIG. 7 shows a schematic view illustrating a fifth embodiment of a decomposition apparatus (E) of the present invention.

FIG. 7 shows a schematic view illustrating a fifth embodiment of a decomposition apparatus E to decompose the organic compound in gas 72, which is evaporated by heat of the liquid 3, by emission of the UV light irradiated from the excimer lamp unit 71 which has excimer lamp. The kind of the heat apparatus 72, the position of the attachment thereof and the heating manner of the heat apparatus are not particularly limited. It is preferable that the excimer lamp 71 is equipped on the top plate of the container 72 to emit the gas 74 which may be either the gas of organic compound or the gas containing the organic compound.

Figure 8:
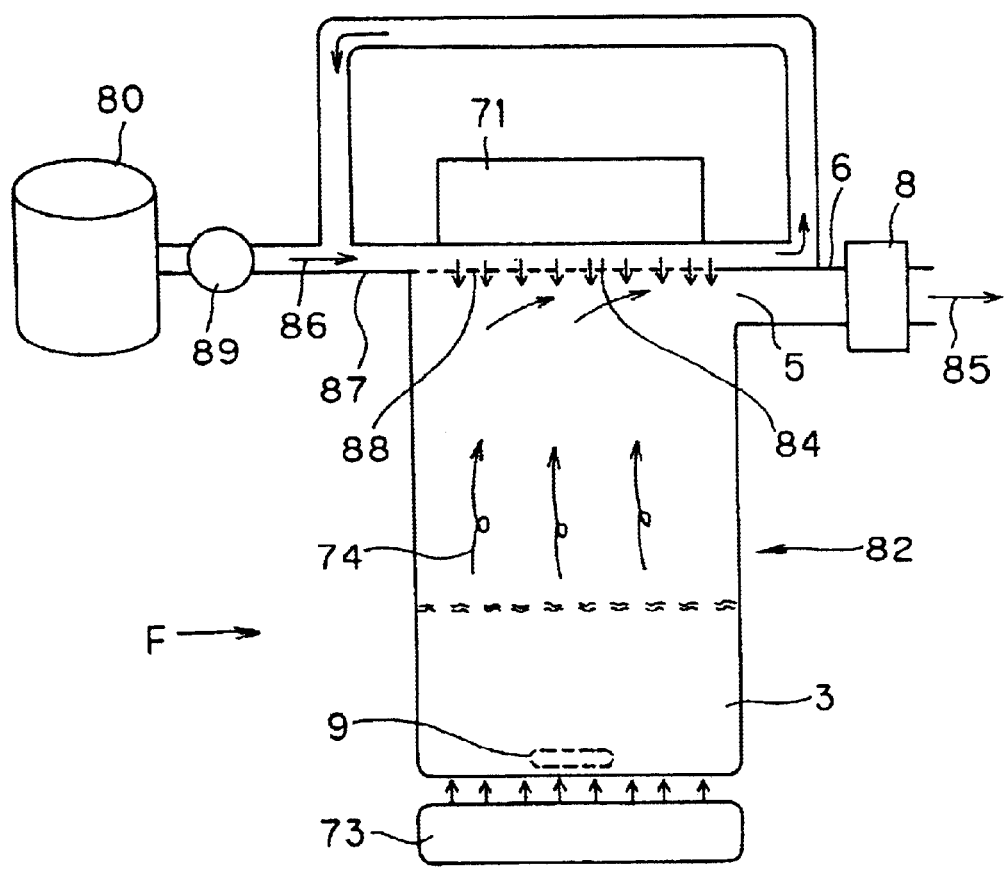

FIG. 8 shows a schematic view illustrating a sixth embodiment of a decomposition apparatus F in which a route of a catalyst gas for promoting the decomposition of the organic compound is equipped to the container 82. The amount of flowing of the catalyst gas 86 is controlled by the flow control valve 89 equipped to the exit of the catalyst gas cylinder 80. The gas 74 evaporated from liquid comprising the organic compound, and catalyst gas 86 is contacted at a contact part 88 of the route 84 of the catalyst gas. The contact part 88 can be equipped with a contact material such as a net-shape material. When a pressure of the catalyst gas 86 in the route 84 is slightly higher than that of the gas 74 in the container 58, the catalyst gas 86 and the gas 74 can be contacted at just outside of the route 84 of the catalyst gas. The catalyst gas 86 may be circulated as shown in FIG. 8. A contact material with a catalyst powder may be equipped to the contact part 88 instead of the catalyst gas 86. Consequently, under the condition described above, the gas 74 is easily decomposed by emission of the UV light irradiated from the excimer lamp unit 71. The decomposed gas 85 is exhausted from the exhaust part 5 with the carbon filter 8. According to the decomposition apparatus, the efficiency of decomposition of the organic compound can be improved.

As the catalyst gas 86 or powder, it is preferable to use that of titanium oxide, magnesium oxide or the like, and the titanium in the titanium oxide or the magnesium in the magnesium oxide attacks the bonded part of C—Cl in particular so that the bonded part of that is cut easily.

Figure 9:
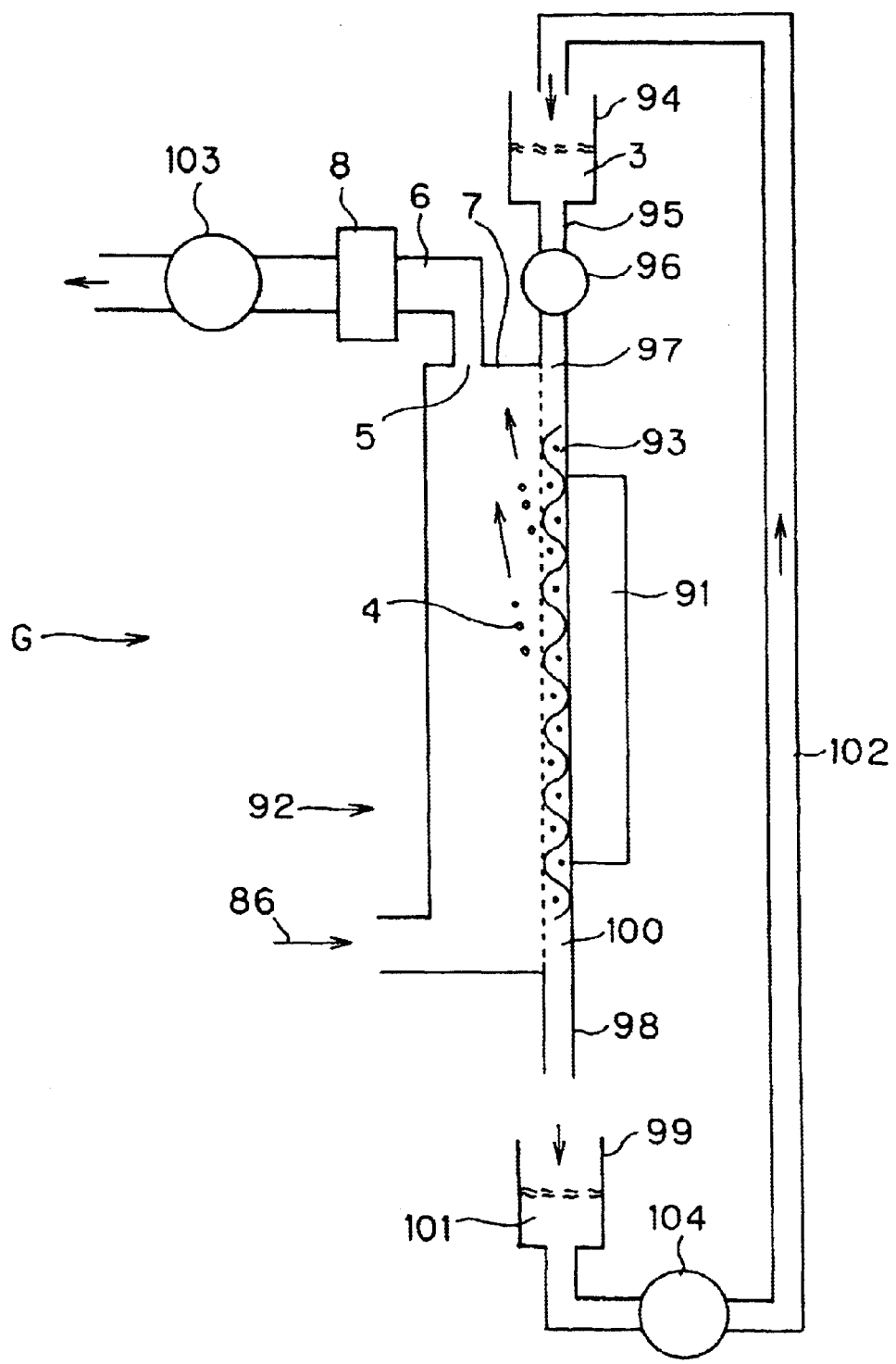
FIG. 9 shows a schematic view illustrating a seventh embodiment of a decomposition apparatus (G) of the present invention.

FIG. 9 shows a schematic view illustrating a seventh embodiment of a decomposition apparatus G. As the decomposition apparatus G, the organic compound is decomposed by emission of the UV light during the liquid 3 of the organic compound flows down in the flow rate buffering material 93 which is equipped on the position in the neighborhood of the surface of excimer lamp unit 91 which has excimer lamp, in the container. The amount of flowing of the liquid 3 is controlled by the flow control valve 96 equipped to the flowing tube 95. The liquid 3 flows down slowly through the flow rate buffering material 93 from the inlet 97 to the container 92. The organic compound in the liquid 3 is decomposed by emission of the UV light irradiated from the excimer lamp unit 91. When the organic compound can not be decomposed sufficiently, a treated liquid 101 is restored to the standing container 99, and is pumped by the circulation pump 104 equipped to the circulation tube 102 to restore in the container 94, and the organic compound in the liquid 3 is decomposed again thereafter. When the liquid flows down slowly in the flow rate buffering material 93 by the control of the flow control valve 96, the organic compound in the liquid 3 can be decomposed efficiently by emission of the UV light.

Figures 10A, 10B:
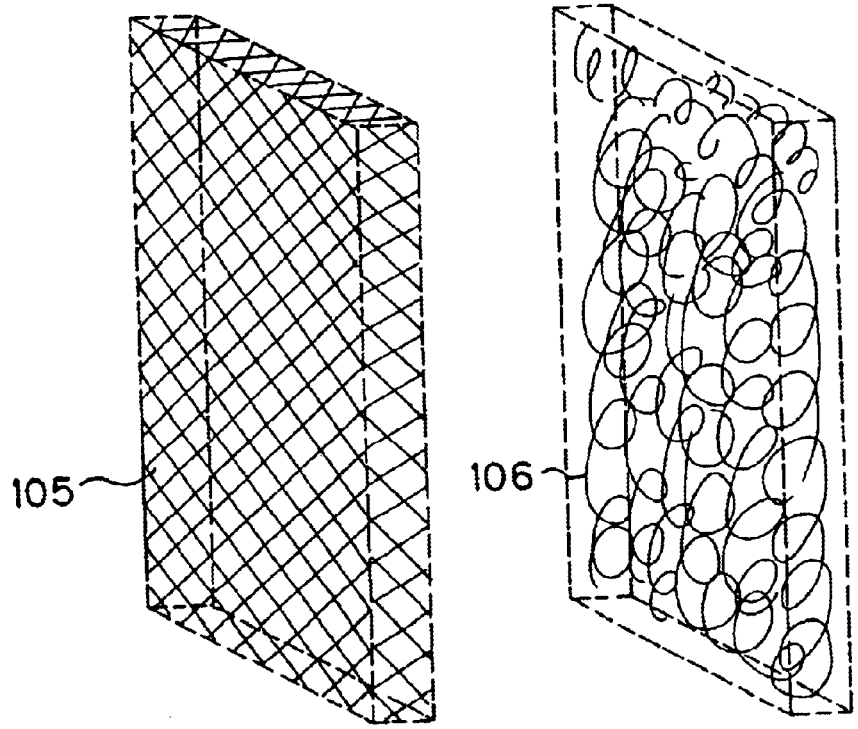
FIG. 10 shows a schematic perspective view illustrating an embodiment of a flow rate buffering material.

As the flow rate buffering material 93, it is preferable that the unreactive material on the UV light and the liquid 3, for example quartz, glass fiber, stainless steel or the like, is used and is worked in a net-shape, an asbestos-shape or a bundle-shape. FIG. 10 shows a schematic perspective view illustrating an embodiment of a flow rate buffering material. In FIG. 10, (a) shows the net-like flow rate buffering material 105, (b) shows the asbestos-shape flow rate buffering material 106.

Figure 11:
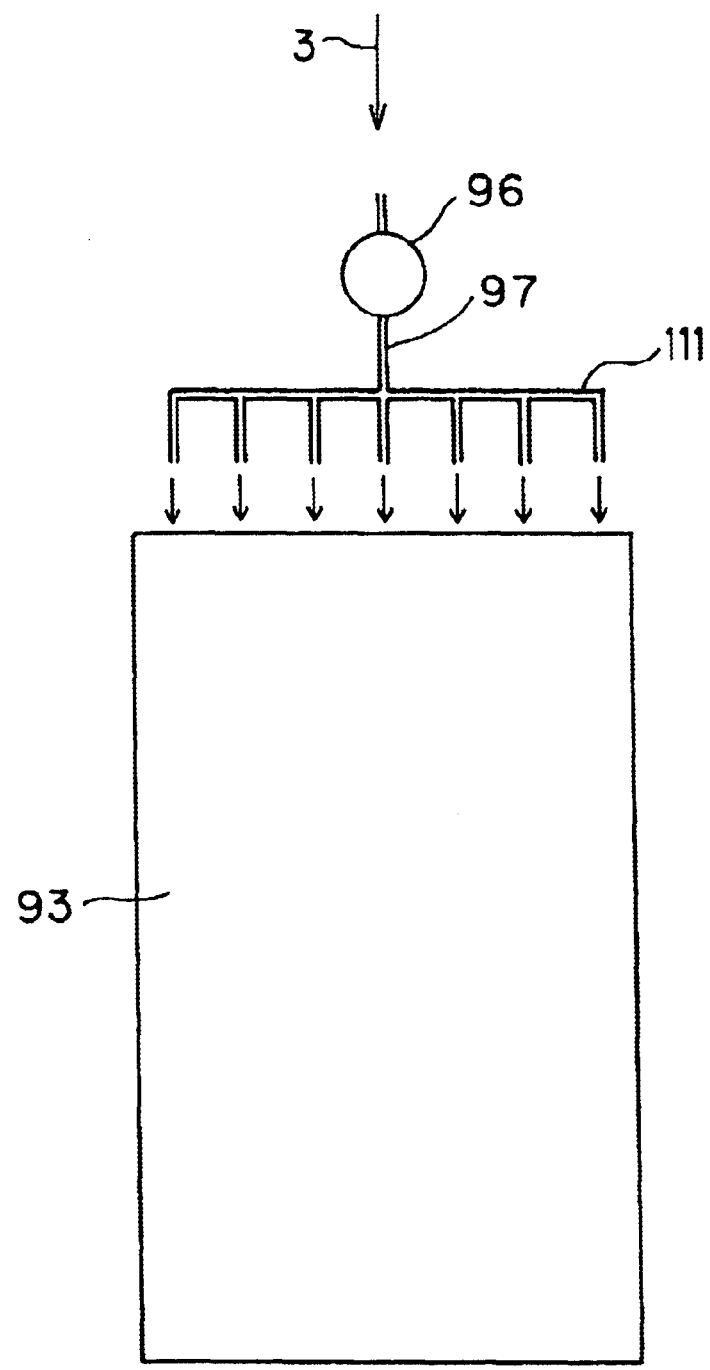
FIG. 11 shows a schematic view illustrating an embodiment of a manner of flowing of the liquid to the flow rate buffering material.

When the liquid 3 flows down in the flow rate buffering material 93, as shown in FIG. 11, the liquid 3 passes the flow rate control valve 96 and the inlet tube 97, is separated by a separated tube 111 and flows down in the wide flow rate buffering material 93. By the flow rate buffering material described above, the efficiency of decomposition of the organic compound is improved since a large amount of the liquid 3 can flow down in the flow rate buffering material 93.

In FIG. 9, the catalyst gas 86 may flow into the decomposition apparatus G to improve the efficiency of decomposition of the organic compound. The catalyst gas 86 described above, which promotes the decomposition of the organic compound in the liquid 3, and the liquid 3 is contacted at the flow rate buffering material 93. The decomposed gas 4 and the catalyst gas 86 may be exhausted from the outlet 5 by absorption of the pump 103. A contact material with the catalyst powder described above may be equipped to the flow rate buffering material 93 instead of the catalyst gas 86. The material of the catalyst gas 86 and powder is the same as that described above.

Figure 12:
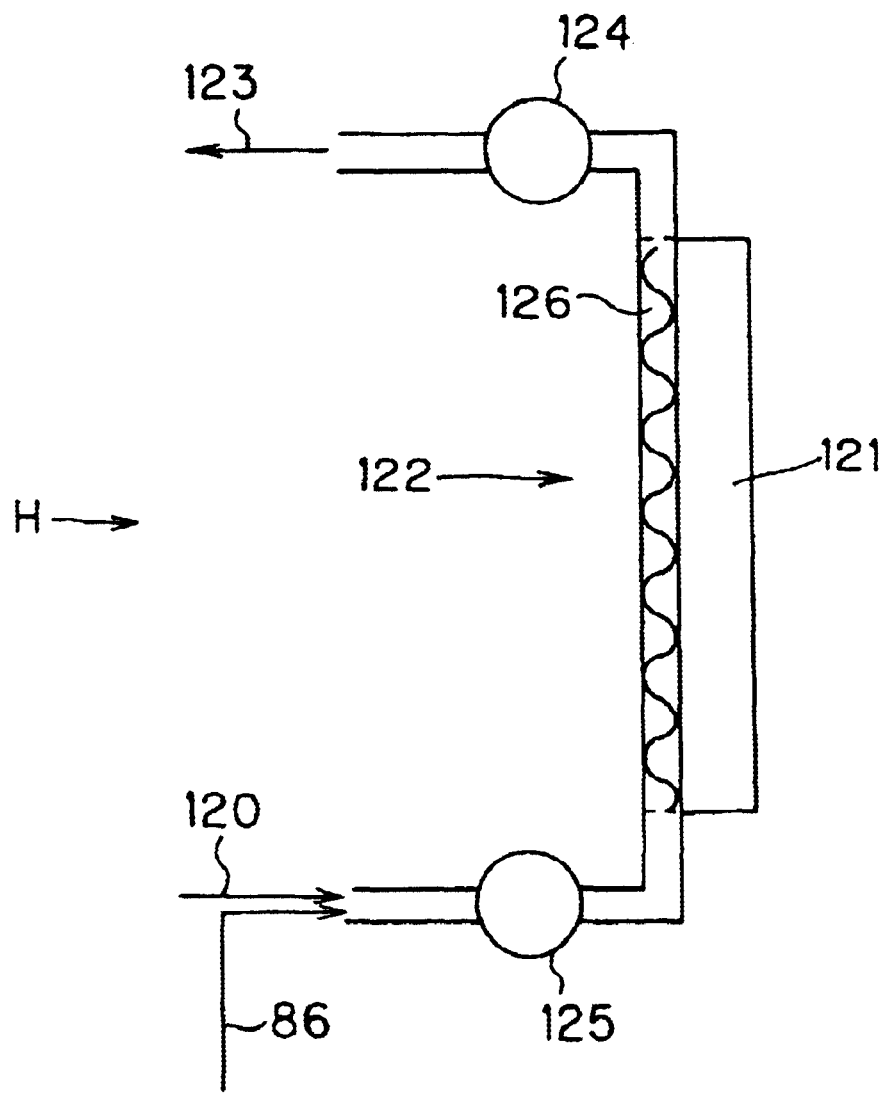
FIG. 12 shows a schematic view illustrating an eighth embodiment of a decomposition apparatus (H) of the present invention.

FIG. 12 shows a schematic view illustrating an eighth embodiment of a decomposition apparatus H for decomposing the gas 120 which is either the gas of the organic compound or the gas containing the organic compound. The organic compound in the gas 120 is decomposed by emission of UV light irradiated from the excimer lamp unit 121, which has excimer lamp, during flowing up in the flow rate buffering material 126 which is equipped on the position in the neighborhood of the surface of the excimer lamp unit 121 in the container 122.

For improving the efficiency of decomposition of the organic compound, the gas 120 may flow up slowly in the flow rate buffering material 126 by the control of the flow rate control valve 125 or the adsorption pump 124. The flow rate buffering material 126 is the same as that described above. When the decomposition apparatus is not equipped with the flow rate buffering material 126, the organic compound in the gas 120 can be decomposed by the control of the flow rate.

In order to improve the efficiency of decomposition of the organic compound in the gas, it is preferable that the gas 120 flows with the same catalyst gas as that described above and passes in the flow rate buffering material with the same catalyst powder as that described above.

Figure 13:
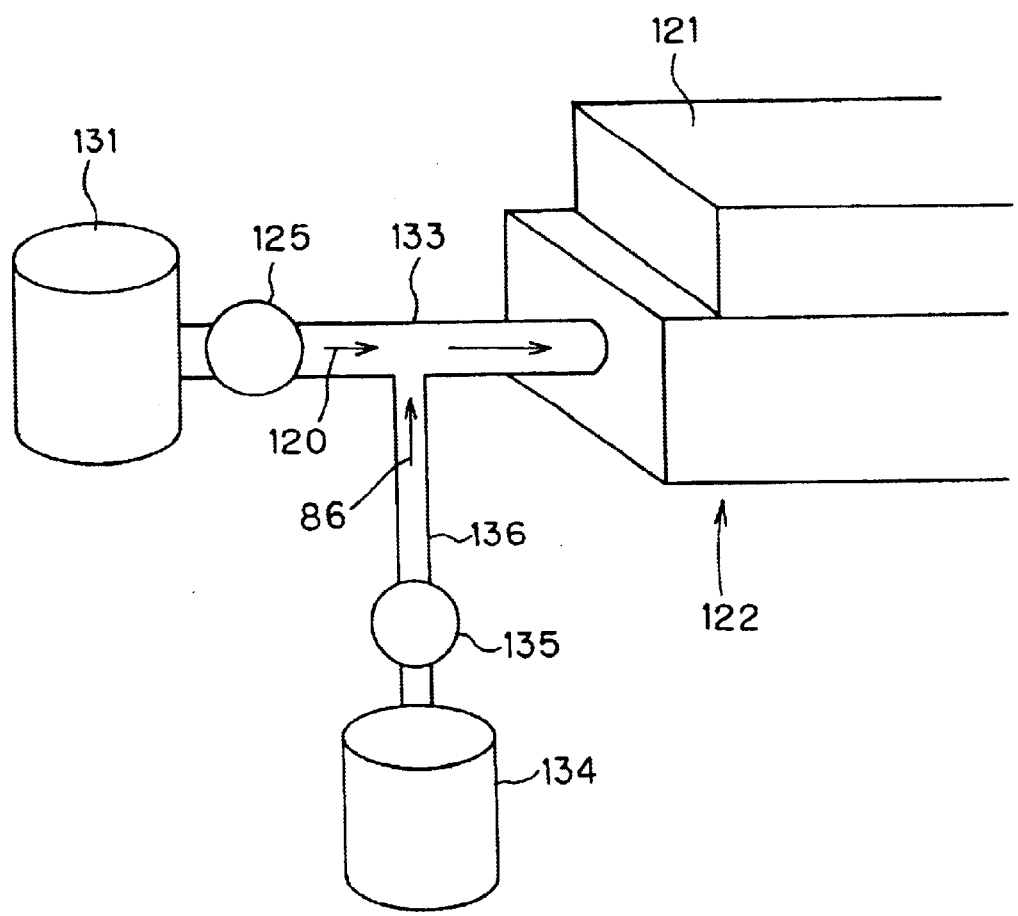
FIG. 13 shows a schematic perspective view illustrating an embodiment of a part of the inlet side of gas in the decomposition apparatus (H) shown in FIG. 12.

FIG. 13 shows a schematic perspective view illustrating an embodiment of a part on the inlet side of gas 120 in the decomposition apparatus H shown in FIG. 12. The upper part of the container 120 is equipped with a cylinder 131 of the gas 120, an inlet tube 133 of the gas 120, a flow rate control valve 132 of the gas 120, a cylinder 134 of the catalyst gas 86, an inlet tube 136 of the catalyst gas 86, and a flow rate control valve 135 of the catalyst gas 86.

Figure 14A:
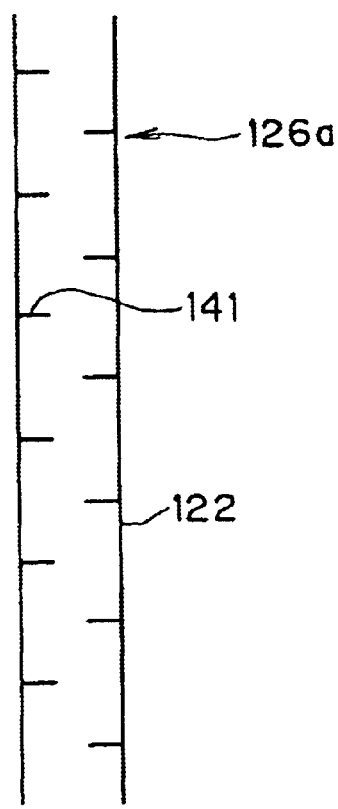
FIG. 14 shows a schematic longitudinal cross sectional view illustrating an embodiment of the flow rate buffering material for the gas in FIG. 12.
Figure 14B:
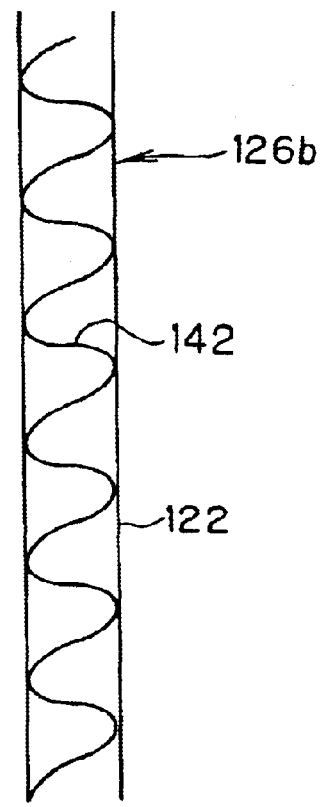

FIG. 14 shows a schematic longitudinal cross sectional view illustrating an embodiment of the flow rate buffering material 126 used in FIG. 12. In FIG. 14, (a) is the hound's-tooth-shape flow rate buffering material 126a which is provided with the hindrance plate 141 of hound's-tooth in the container 122, (b) is the net-shape flow rate buffering material 126b which is provided with the net-shape member 142 of wave-shape in the container 122. The flow rate buffering material 126 used in FIG. 14 may be used in the same manner as that of the flow rate buffering material 105, 106 as shown in FIG. 10.

Figure 15:
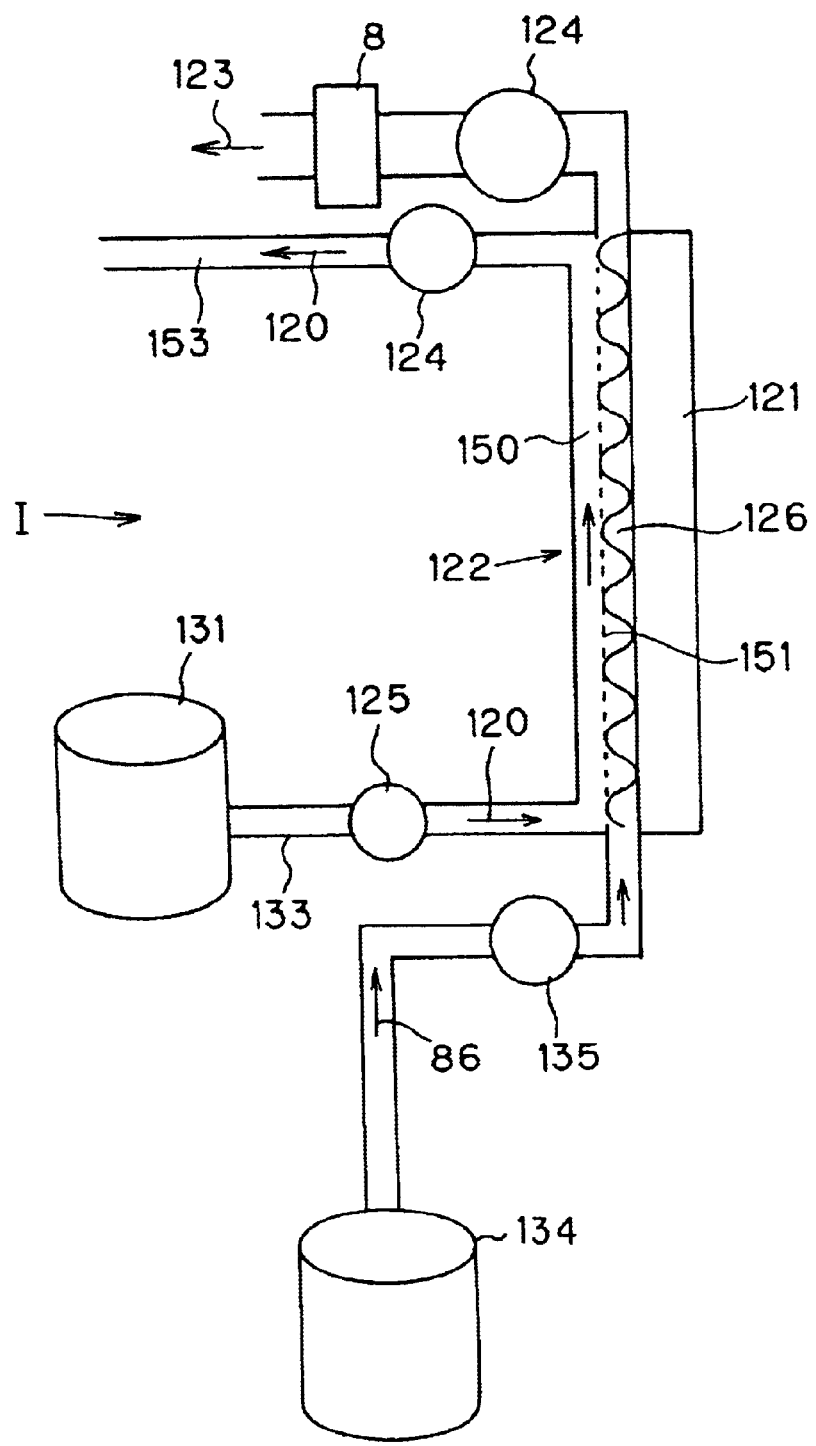
FIG. 15 shows a schematic view illustrating a ninth embodiment of an decomposition apparatus (I) of the present invention.

FIG. 15 shows a schematic view illustrating a ninth embodiment of a decomposition apparatus I provided with the route 150 of the catalyst gas in the decomposition apparatus shown in FIG. 12. The route 150 of the catalyst gas is equipped to the container in the neighborhood of the flow rate buffering material 126 so that the catalyst gas promotes the decomposition of the organic compound in the gas 86 on the contacting part 151. In the decomposition apparatus I, the catalyst gas 120 and the gas 86 flows to the container through the different route. Therefore, in order to mix the gas 86 and the catalyst gas 120 in the container, it is preferable that a pressure of the catalyst gas 86 in the route 150 of the catalyst gas is slightly higher than that of the gas 3 in the route of the gas 3. The catalyst gas 120 flows from holes of the contacting part 151 to the flow rate buffering material 126. The decomposed gas 123 is exhausted through the adsorption pump 124. The catalyst gas 120, except the catalyst gas flowed in the flow rate buffering material 126, is exhausted through the outlet part 153 of the catalyst gas. The catalyst gas 120 exhausted through an outlet part 153 may be used again by the circulation. The flowing direction of the catalyst gas 120 may be opposed to the direction of flow of the gas 86. The other numericals are the same as those in figures described above.

According to the decomposition apparatus of the first mode of the present invention described above, since the UV light irradiated from excimer lamp or excimer lamp unit is emitted to the liquid or the gas containing the organic compound, the organic compound in the liquid or the gas can be decomposed easily by the simple decomposition apparatus and method. The decomposition apparatus and method are effective to decompose the organic chloride compound polluting the air or water, to purify the environment.

Figure 16:
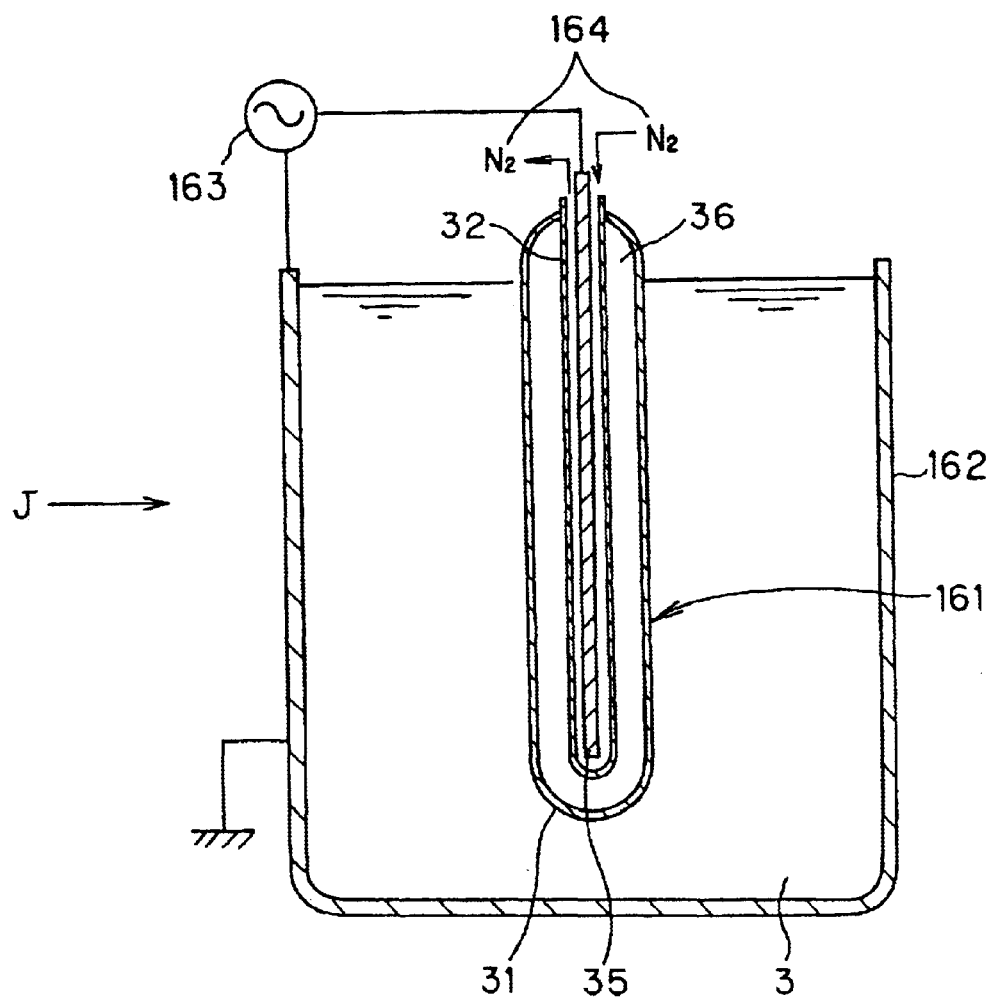
FIG. 16 shows a schematic longitudinal cross sectional view illustrating a tenth embodiment of a decomposition apparatus (J) of the present invention.

Next, a decomposition apparatus for decomposing the organic compound in the second mode of the present invention will be explained below. FIG. 16 shows a schematic longitudinal cross sectional view illustrating another embodiment of a decomposition apparatus J. In FIG. 16, the decomposition apparatus J comprises an excimer emission body 161 equipped with an inner electrode 35, a metal container 162 equipped to the outside of the excimer emission body 161 for filling up at least one selected from a liquid of an organic compound and a liquid containing organic compound, and a power supply for applying a high frequency voltage between the inner electrode 35 and the metal container 162.

The UV light is irradiated from the excimer emission body 136 by the applying of the voltage of the suitable frequency between the inner electrode 35 and the metal container 162 so that UV light is emitted to the liquid 3. The metal container 162 acts as the outer electrode shown in FIG. 3 so that the applying of voltage between the metal container 162 and the inner electrode 35 generates the high frequency discharge to irradiate the UV light. Although the UV light of wavelength of 222 nm or below is not generated the ozone in the liquid 3 or air, the UV light allows to generate the high reactive OH radical or O radical in the liquid 3. The radical cuts some bond of the organic compound so that the organic compound in the liquid 3 is decomposed efficiently to the decomposed material of $CO_2$, $H_2O$ and so.

The excimer emission body 161 comprises the discharging vessel 31 made of the dielectric material with excellent permeability of UV light, the inner tube 32 equipped on the inside of the discharging vessel 31, the inner electrode 35 equipped on the inside of the inner tube 32 and the filling gas 36 filled up in the discharging vessel 31. The form of the excimer emission body 161 is not limited in particularly. The excimer emission body 161 is the same as that of the excimer lamp 1 of the decomposition apparatus of the first mode described above, except the displacement of the outer electrode 34 to the metal container 162 and to be not equipped with the protect tube 33. The decomposition apparatus shown in FIG. 3 is provided with the outer electrode 34 to the outer side of the discharging vessel 31 in usual. However, the decomposition apparatus J shown in FIG. 16 is provided with the metal container 162 filled up the liquid on the outer side of the excimer emission body 161. The metal container 162 acts as the outer electrode. The UV light is emitted to the liquid 3 efficiently because of without the outer electrode, and therefore, the decomposition apparatus can improve the efficiency of decomposition of the organic compound. The component part equipped to the excimer emission body 161 is described below.

A nitrogen gas 164 may flow on the inside of the inner tube 32 of the excimer emission body 161 to cool. The kind of the nitrogen gas 164 is not limited particularly. The commercial nitrogen gas may be used. The inner tube 32 can be cooled sufficiently by flowing of the nitrogen gas 164 at a low temperature cooled by the heat exchanger (no illustrating in figures). The circulating cooling apparatus (no illustrating in figures) of the nitrogen gas is equipped to the decomposition apparatus J for supplying the nitrogen gas 164. The inner tube 32 can be prevented from deterioration so that the lifetime of the excimer emission body 161 can be improved.

As the metal container 162, it is preferable to use the stainless steel or the like which has a high conductivity and high corrosion resistance to the liquid 3 containing the organic compound. The metal container 162 has the property of shielding (so-called: EMI shield property) on the high frequency electromagnetic wave irradiated from the excimer emission body 161.

The voltage between the metal container 162 and the inner electrode 35 is of any frequency to irradiate the suitable amount of emission of UV light. It is preferable to apply the high wavelength voltage from 1 to 20 MHz. The detailed explanation is described below. A position and a manner of attachment of the excimer generator 161 are not limited.

According to the decomposition apparatus described above, as the metal container 162 acts as the outer electrode and the container for filling the liquid 3, the construction of the decomposition apparatus can be simple. As the UV light is not hindered by the outer electrode, the liquid is emitted by the UV light sufficiently. As the large amount of OH radical or O radical generates in the liquid, the bond of the organic compound is cut efficiently so that the organic compound is decomposed easily.

Next, an excimer lamp and an excimer emission apparatus used for the decomposition apparatus or the decomposition method of the organic compound described above will be explained by the reference in figures.

Figure 17:
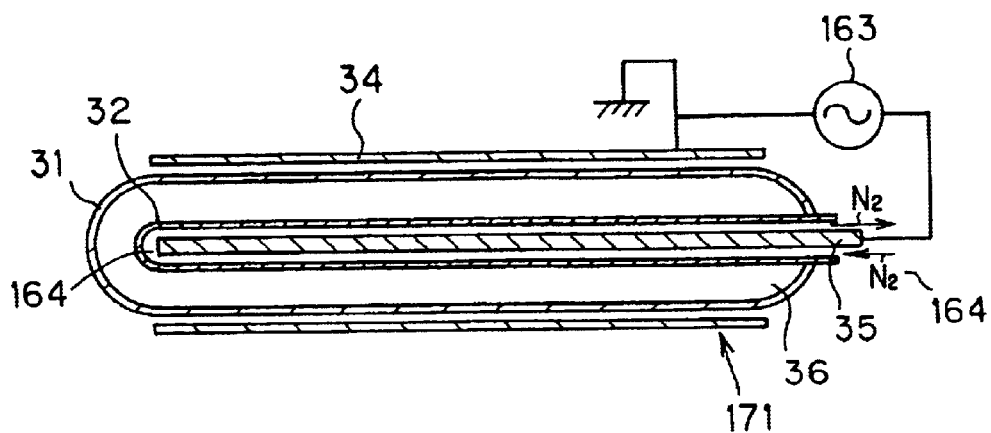
FIG. 17 shows a schematic longitudinal cross sectional view illustrating an embodiment of a excimer lamp of the present invention.

An excimer lamp will be explained below. FIG. 17 shows a schematic longitudinal cross sectional view illustrating an embodiment of an excimer lamp of the present invention. The excimer lamp 171, such as explained in FIG. 3, comprises the discharging vessel 31 made of a dielectric material with excellent permeability of UV light, the inner tube 32 equipped on the inside of the discharging vessel 31, the outer electrode 34 equipped on the outside of the discharging vessel 31, the inner electrode 35 equipped on the inside of the inner tube 32 and the filling gas 36 filled up in the discharge vessel 31. The UV light is preferably irradiated from the excimer lamp 171 by which a high frequency voltage is applied between the outer electrode and inner electrode 32 from 1 to 20 MHz. The UV light is emitted from the excimer lamp 171 to the liquid. A protect tube (no illustrating in figures) may be equipped on the outside of the discharging vessel 31. The outer electrode 34 may be equipped to the position between the protect tube and the discharging electrode 34. The discharging vessel and the protect tube may be made of dielectric material with permeability of the UV light. It is preferable to use a quartz or a synthetic quartz with a high permeability.

The filling gas 36 is filled in the discharging vessel 31 for discharging the excimer lamp 171. The wavelength of the UV light varies by the kind of the filling gas. As the filling gas 36, it is preferable to use the gas of He, Xe, Kr, Ar, ArF, ArCl, KrF, XeF, XeCl, XeBr, $F_2$—Kr—He or the like. A pressure and a kind of gas in the discharging vessel 31 are determined by the suitable condition to obtain a required wavelength and a required amount of irradiation of UV light. It is preferable to fill the pressure of from 10 to 60 kPa. The other things are explained in FIG. 3.

The inner tube 32 also uses a quartz or a synthetic quartz with dielectric. It is preferable that the inner tube 32 is equipped to the center of the discharging vessel 131 so that the excimer lamp can be uniformly emitted the UV light on the around of the inner tube 32. As shown in FIG. 16, the nitrogen gas 164 flows in the inner tube 32. Since the inner tube 32 is cooled by the nitrogen gas 164, the deterioration of the inner tube 31 can be prevented and is the same as that of the discharging vessel 31 so that the lifetime of the excimer lamp can be improved.

Figure 18:
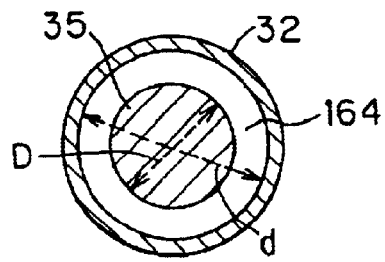
FIG. 18 shows a schematic cross sectional view illustrating an embodiment of the relationship between the inner tube and the inner electrode of the excimer lamp of the present invention.

FIG. 18 shows a schematic cross sectional view illustrating an embodiment of the relationship between the inner tube and the inner electrode of the excimer lamp of the present invention. It is preferable that d/D ratio, which the "d" is an inner diameter of the inner tube and the "D" is an outer diameter of the inner electrode 35, is from 1.1 to 3.0 for flowing the nitrogen gas 164 in the inner tube 32 easily. When the d/D ratio is below 1.1, the space between the inner tube 32 and the inner electrode is not enough so that the nitrogen gas 164 can not flow in the inner tube 32 and the inner tube 32 can not be enough cooled by the nitrogen gas 164. When the d/D ratio is above 3.0, the nitrogen gas 164 flows easily so that the inner tube 32 is cooled sufficiently. In this case, however, it is not preferable that the outer diameter of the inner tube becomes thick and that of the excimer lamp becomes thick, too, or the excimer lamp can not be discharged uniformly since the outer diameter of the inner electrode 35 becomes thin. Therefore, the d/D ratio is limited from 1.1 to 3.0.

As the inner electrode 31, it is preferable to use stainless steel, aluminum, aluminum alloy, copper, copper oxide, alloy containing of copper, alloy containing copper oxide or the like. The inner electrode 35 does contact the filling gas 36 so that the high frequency discharge happens on all parts of the inner tube 32.

Figure 19:
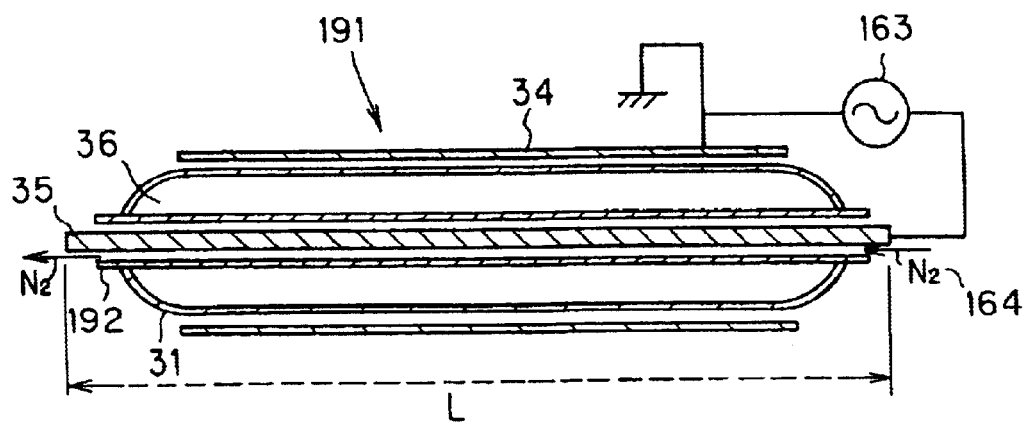
FIG. 19 shows an schematic longitudinal cross sectional view illustrating an embodiment of an excimer lamp of the present invention.
Figure 20:
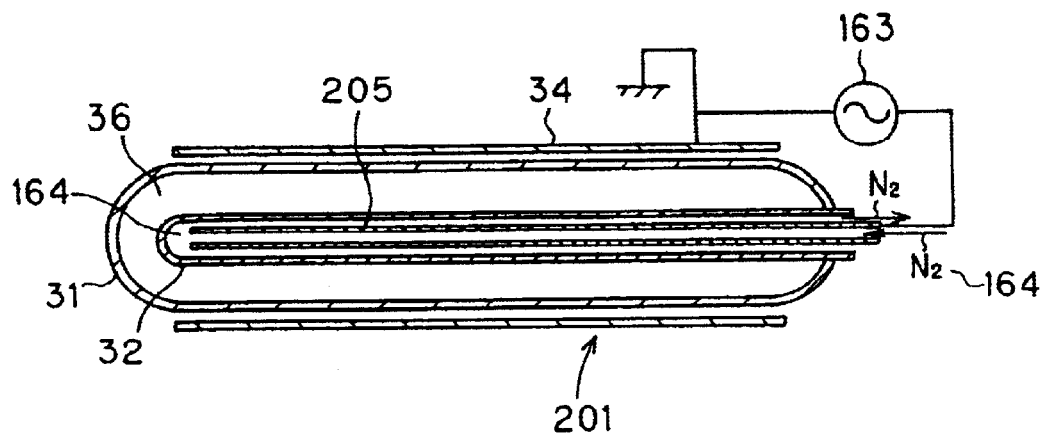
FIG. 20 shows an schematic longitudinal cross sectional view illustrating an embodiment of an excimer lamp of the present invention.
Figure 21:
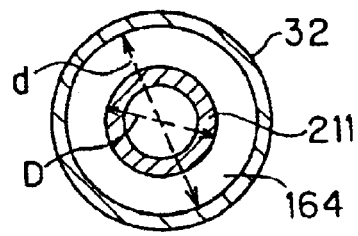
FIG. 21 shows a schematic cross sectional view illustrating an embodiment of the relationship between the inner tube and the inner electrode of the excimer lamp of the present invention.
Figure 22:
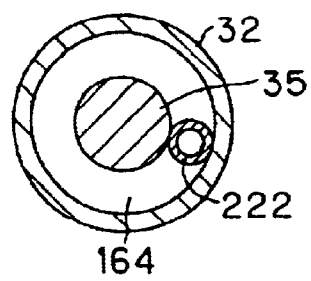
FIG. 22 shows a schematic cross sectional view illustrating an embodiment of the relationship between the inner tube and the inner electrode of the excimer lamp of the present invention.
Figure 23:
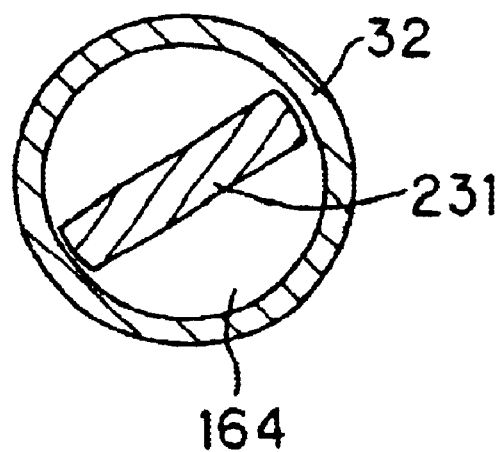
FIG. 23 shows a schematic cross sectional view illustrating an embodiment of the relationship between the inner tube and the inner electrode of the excimer lamp of the present invention.

FIG. 19 and FIG. 20 show an schematic longitudinal cross sectional view illustrating an embodiment of an excimer lamp of the present invention, respectively. FIG. 21 to FIG. 23 show a schematic cross sectional view illustrating an embodiment of the relationship between the inner tube and the inner electrode of the excimer lamp of the present invention.

When both ends of the inner tube 192 are open, it is preferable to use the rod-shaped inner electrode 35. As a result, the inner tube 192 can be cooled sufficiently because of flowing easily the nitrogen gas 164 from one end side to the other end side. When one end of the inner tube 35 is closed, it is preferable to use the hollow pipe-shape inner electrode 211 (as shown in FIG. 21). As a result, the inner tube 32 can be cooled sufficiently since the nitrogen gas 164 flows from the inside of the electrode 211 to the outside of the electrode 211. When the form of the inner electrode is the hollow pipe-shaped, it is preferable that d/D ratio, in which the "d" is a inner diameter of the inner tube 32 and the "D" is an outer diameter of the hollow pipe-shape inner electrode 211, is in the range of that described above.

When one end of the inner tube 32 is closed, the rod-shape inner electrode may be used. As shown in FIG. 22, the insertion tube 221 may be inserted to the suitable position along the inner electrode 35 so that the nitrogen gas 164 can flow in the inner tube 32 easily. Furthermore, as shown in FIG. 23, the inner electrode 231 of the flat-shape may be used for separating the inlet-side and the outlet-side of the nitrogen gas 164 so that the nitrogen gas 164 can flow in the inner tube 32 easily.

It is preferable that LD ratio, in which the "L" is a length of the inner electrode 35, 211, 221 and the "D" is an outer diameter of the inner electrode, is of from 10 to below 30. The length L of the inner electrode is in proportion to that of the excimer lamp 1, 161, 171, 191, 201, and the length of the inner electrode is determined by that of the excimer lamp. With the increase of the outer diameter D of the inner electrode, the outer diameter of the inner tube and the discharging vessel becomes thick so that the outer diameter of the excimer lamp becomes thick, too.

When the L/D is below 10, the inner tube is cooled sufficiently by the nitrogen gas flowed in the inner tube since the outer diameter of the inner electrode and the excimer lamp becomes thick. Consequently, the efficiency of emission of the UV light is not improved since the surface area of the excimer lamp decreases.

When the L/D is 30 or above, the inner tube becomes longer, and the nitrogen gas cannot flow sufficiently in the inner tube so that the inner tube is not cooled sufficiently. Therefore, the L/D is limited from 10 to 30 below.

As the outer electrode 34, it is preferable to use a material made of stainless steel, aluminum or the like. Any electrode of punching metal shape, mesh shape or net shape may be equipped around of the discharging vessel 31. The electrode of rod shape or oblong shape may be equipped lengthwise of the discharging vessel 31. When the electrode of punching metal shape, mesh shape or net shape is used, the shield property of the excimer lamp is improved on an electromagnetic wave of high frequency (so-called: EMI shield). When the electrode of the rod shape or the oblong shape is used, the UV light is emitted from the surface of the excimer lamp sufficiently since a large amount of the UV light can irradiate from the excimer lamp.

In the excimer lamp, a protect tube may be provided on the outer side of the outer electrode 34, if necessary, and a nitrogen gas may introduced-into the space between the protect tube and the discharging vessel 31.

The amount of the UV light increases with the applying of high frequency voltage so that the efficiency of irradiation of the UV light increases. Therefore, since the thermal efficiency of the excimer lamp and the irradiation efficiency of UV light is high, the excimer lamp can save electricity and is of economical. It is preferable that the frequency of voltage applied to the excimer lamp is of from 1 to 20 MHz, particularly of from 5 to 16 MHz, furthermore preferably of from 11 to 15 MHz. In this case, it is preferable that the high frequency voltage outputted from the power supply 163 is of from 0.1 to 10 V, particularly of from 0.1 to 5 V. When the voltage is below 0.1 V, the large amount of the UV light can not irradiate since the high frequency discharge can not happen between the outer electrode 34 and the inner electrode 35 sufficiently. When the voltage is above 10V, the amount of the UV light saturates so that the irradiation efficiency of the UV light does not increase and the excimer lamp does not save electricity.

According to the excimer lamp of the present invention, since the inner tube is cooled by flowing the nitrogen gas, the deterioration of the inner tube can be prevented and is the same as that of the discharging vessel so that the lifetime of the excimer lamp can be improved. The excimer lamp, which can irradiate the UV light of wave length of 222 nm or below, can prevent the deterioration of the inner tube. The nitrogen gas used can be treated safely and the construction of the excimer lamp can be simple.

Figure 24:
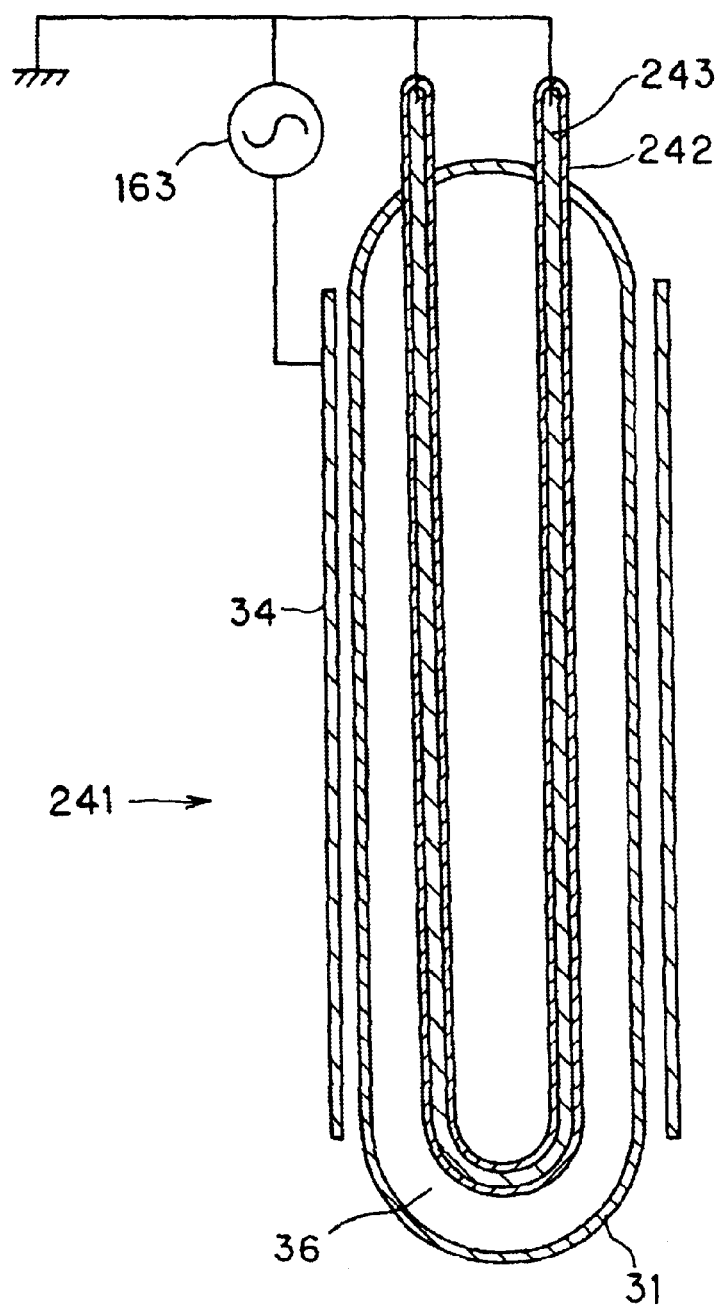
FIG. 24 shows a schematic longitudinal cross sectional view illustrating an embodiment of the excimer lamp of the present invention.
Figure 25:
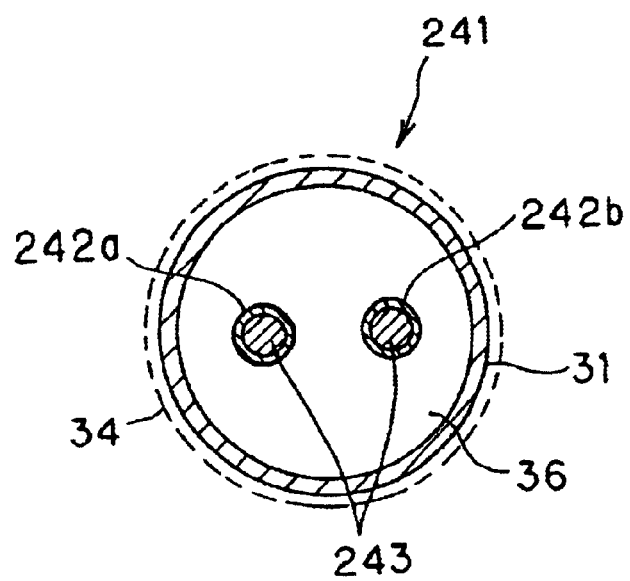
FIG. 25 shows a schematic cross sectional view in perpendicular direction to lengthwise direction illustrating an embodiment of the excimer lamp as shown in FIG. 24.

FIG. 24 shows a schematic longitudinal cross sectional view illustrating an embodiment of the excimer lamp of the present invention. The excimer lamp 241 is equipped with the U-shape inner tube 242 on the inner side of the discharging vessel 31. FIG. 25 shows a schematic cross sectional view illustrating an embodiment of the excimer lamp as shown in FIG. 24. FIG. 26 shows a schematic cross sectional view illustrating an embodiment of the U-shape inner tube 242 used for the excimer lamp of the present invention.

At least one U-shape inner tube 242 is equipped on the inside of the discharging vessel 31. The inner tube 242 is usually made of the quartz, the synthetic quartz or the like, having dielectric property. Since the inner electrode 243 is equipped on the inside of the inner tube 242, the discharging vessel 31 with the inner tube 242 is almost the same as that of a discharging vessel with two inner electrodes so that the opportunity of high frequency discharge in the excimer lamp increases. The increase of the opportunity of high frequency discharge can extremely improve the irradiation efficiency of the UV light.

Figures 26A, 26B:
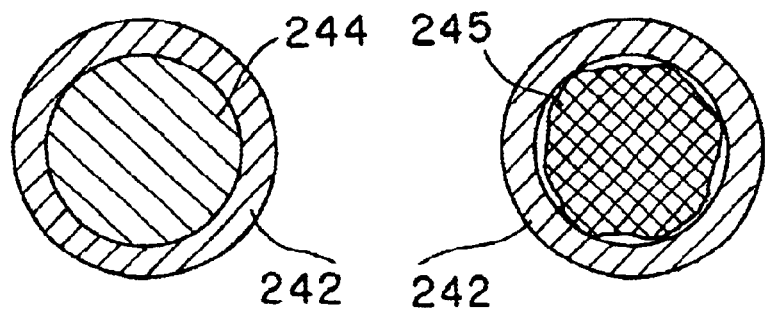
FIGS. 26A and 26B show a schematic cross sectional view illustrating an embodiment of the U-shape inner tube used for the excimer lamp of the present invention.

As the inner electrode 243 as shown in FIG. 26(a), it is preferable to use the liquid metal 244, especially mercury. The liquid metal 244 can flow in the U-shape inner tube 242 easily so that the U-shape inner electrode and the excimer lamp become thin. As shown in FIG. 26(b), the inner electrode 243 may be the electrode 245 of the net-shape. As the electrode 245 of net-shape metal 245, it is preferable to use that made of the copper wire.

Figure 27:
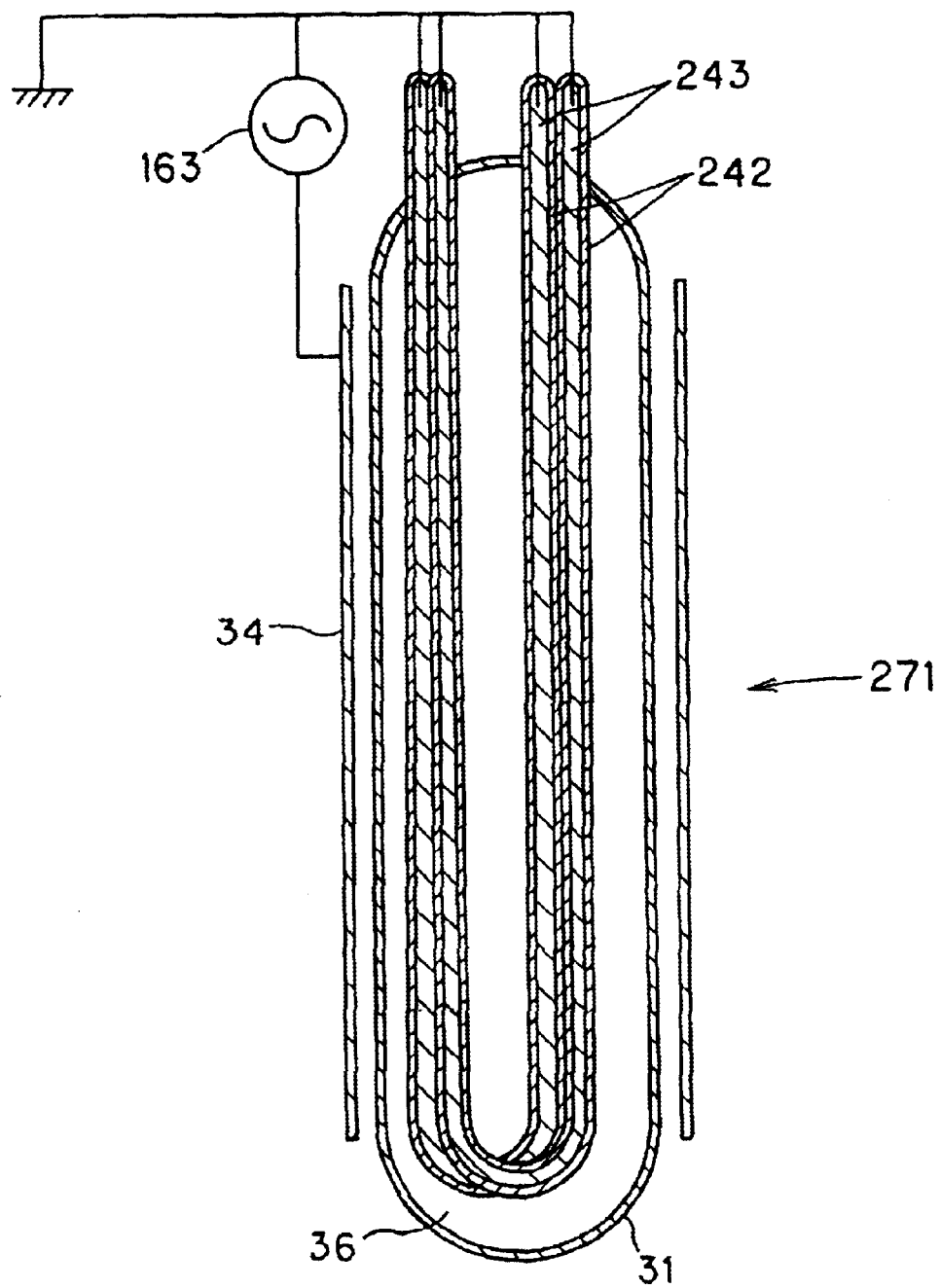
FIG. 27 shows a schematic longitudinal cross sectional view illustrating an embodiment of an excimer lamp of the present invention.
Figure 28:
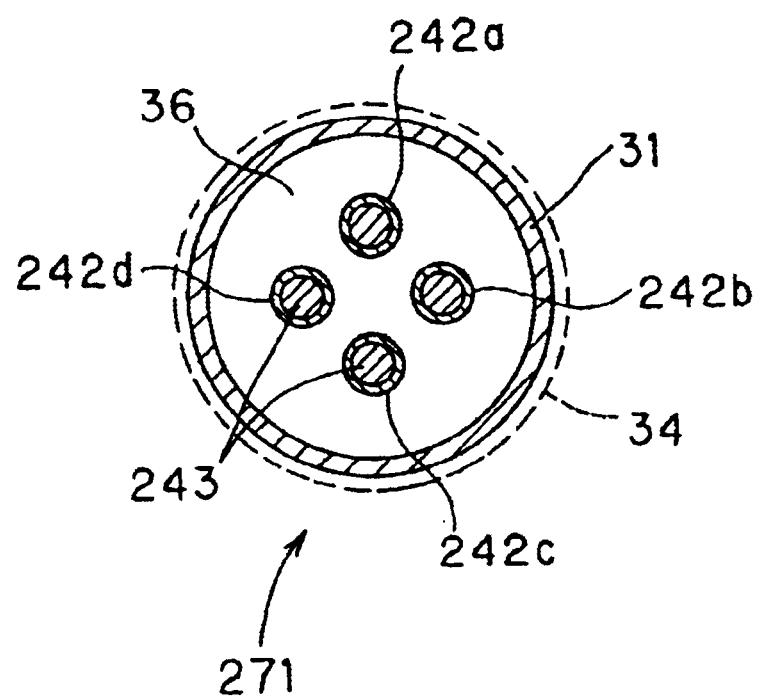
FIG. 28 shows a schematic cross sectional view illustrating an embodiment of an excimer lamp in FIG. 27.

FIG. 27 shows a schematic longitudinal cross sectional view illustrating an embodiment of an excimer lamp 271 of the present invention. FIG. 28 shows a schematic cross sectional view illustrating an embodiment of an excimer lamp 271 in FIG. 27. The excimer lamp 271 is equipped with the two U-shape inner tubes 242 to the inside of the discharging vessel 31 so that the opportunity of the high frequency discharge between the outer electrode and the inner tube 242 increases. Consequently, the irradiation efficiency of the UV light can be improved.

Last, an excimer emission apparatus of the present invention will be explained as follows.

Figure 29:
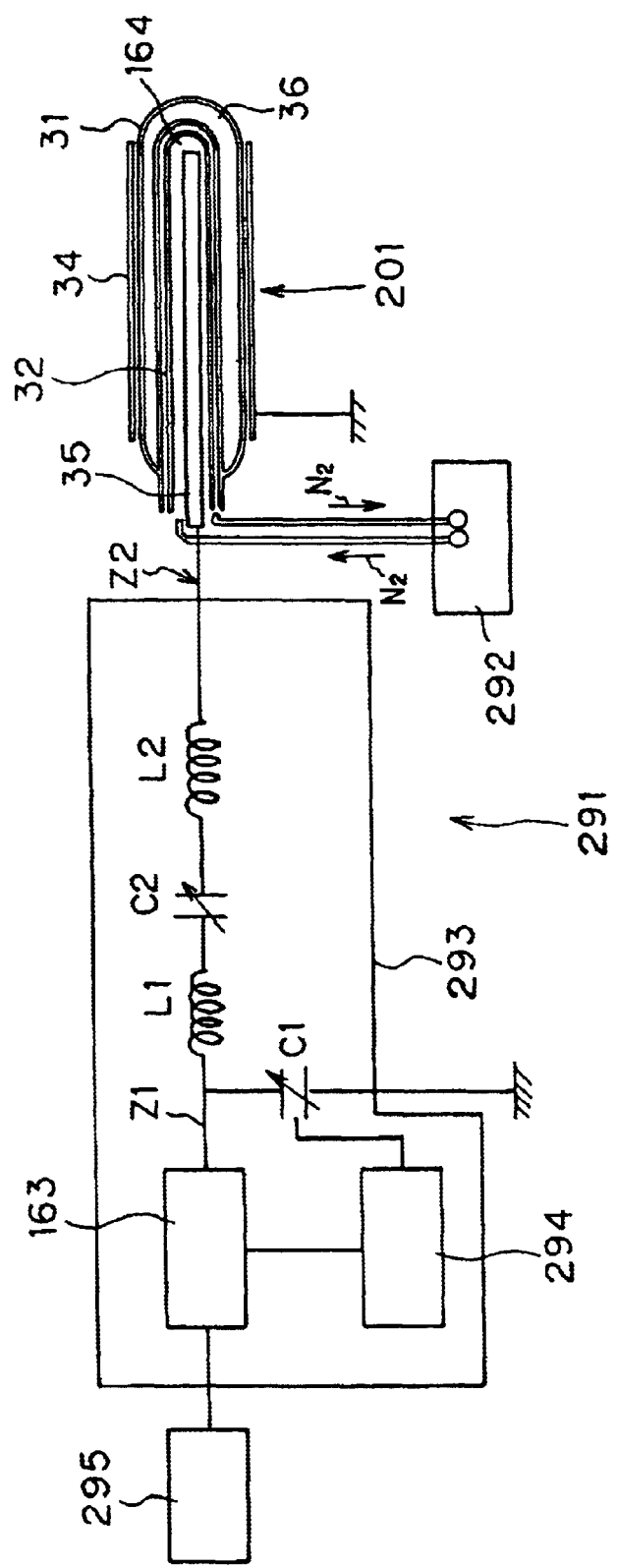
FIG. 29 shows a schematic view illustrating an embodiment of an excimer generating apparatus of the present invention.

FIG. 29 shows a schematic view illustrating an embodiment of an excimer emission apparatus 291 of the present invention. The excimer emission apparatus 291 comprises the excimer lamp of the present invention described above (for example, the numerical number is 201), a high frequency power supply 163 for applying the voltage from 1 to 20 MHz between the outer electrode 35 and the inner electrode 35, a circulating cooling apparatus 292 for flowing the nitrogen gas in the inner tube 32. The detail explanation of the excimer lamp is described above.

The nitrogen gas circulates in the inner tube 32 to cool it. Since the deterioration of the inner tube cooled by UV light and the heat becomes slowly, the degree of deterioration of the inner tube can be the same as that of the discharging vessel 31. Consequently, the lifetime of the excimer lamp can be improved.

The high frequency power supply 163 can apply the voltage of the high frequency from 1 to 20 MHz between the outer electrode 34 and the inner electrode 35 of the excimer lamp 20. The construction of the excimer lamp is not limited that of shown in FIG. 29. In the case of the excimer emission apparatus 291 as shown in FIG. 29, the high frequency power supply 163 is provided at a power supply apparatus 293 as a main element. The high frequency power supply 163 may comprises the other component, for example, a matching controller 294, variable capacitors C1, C2 or the like.

The power supply apparatus 293 as shown in FIG. 29 comprises the high frequency power supply 163, the matching controller 294, inductances L1, L2 and the variable capacitors C1, C2, as fundamental element. The alternating power supply 295 applies an electrical power of approximately 100V to the power supply apparatus 293. The high frequency power supply 163 converts the electrical power to that of the predetermined frequency from 1 to 20 MHz. The frequency converted is output from the high frequency power supply 163. It is preferable that the voltage of the high frequency described above is of from 0.1 to 10 V, particularly of from 0.1 to 5V. The control of the variable capacitor C1 by the matching controller 294 matches the impedance Z1 outputted from the high frequency power supply 163 with the impedance Z2 inputted on the excimer lamp 201. Consequently, In the circuit in the power supply apparatus 293 shown in FIG. 29, the excimer lamp 201 irradiates the UV light at a high efficiency.

In the excimer emission apparatus of the present invention, the excimer lamp 201 generates the high frequency discharge by applying the electrical power from 25 to 30 W with the high frequency of 13.56 MHz, to irradiate 10 mW/cm$^2$ of the UV light from the excimer lamp 201. However, in a prior excimer emission apparatus, the excimer lamp generates the dielectric barrier discharge by applying the electrical power of 50 W with the voltage from 1 to 10 kV of any frequency from 40 to 300 kHz, to irradiate 10 mW/cm$^2$ of the light from the prior excimer lamp. Therefore, the excimer emission apparatus of the present invention converts the input energy to the UV light efficiently so that the generation of heat of the excimer lamp decreases. The lifetime of the prior excimer lamp, consequently, is shorter than that of the excimer lamp of the present invention since the prior excimer lamp generates more the deterioration due to generation of heat than that of the present invention.

What is claimed is:

1. A method for decomposing an organic compound contained in a fluid in a state of liquid or gas, comprising steps of:

flowing said fluid into a decomposition container provided with an excimer lamp which is composed of a discharging vessel made of a dielectric material with permeability of UV light and filled up with a filling gas, an inner electrode equipped inside an inner tube provided inside said discharging vessel and an outer electrode, and applying a high frequency voltage from 1 to 20 MHz between the inner electrode and the outer electrode of the excimer lamp, while flowing the fluid into the decomposition container, thereby decomposing an organic compound contained in the fluid by emission of ultraviolet light irradiated from the excimer lamp.

2. A decomposition method as claimed in claim 1, wherein an organic compound is selected from flon, dioxin (polychlorinated dibenzo-para-dioxin), PCB (polychlorinated biphenyl), trichloroethylene, tetrachloroethylene, dichloromethane, tetrachloromethane, 1,2-dichloroethane, 1,1-dichloroethane, cis-1,2-dichloroethane, 1,1,1-trichloroethane, 1,3-dichloropropene and a mixture thereof.

3. A decomposition method as claimed in claim 1, wherein a wave length of the UV light is 222 nm or below.

4. A method for decomposing said organic compound contained in a fluid in a state of liquid or gas, comprising steps of:

flowing said liquid into a decomposition container made of a metal and provided with an excimer lamp which is composed of a discharging vessel made of a dielectric material with permeability of UV light and filled up with a filling gas, an inner electrode equipped inside an inner tube provided inside said discharging vessel and an outer electrode which is a part of the decomposition container, and applying a high frequency voltage from 1 to 20 MHz between the inner electrode and the outer electrode of the excimer lamp, while flowing the liquid into the decomposition container, thereby decomposing an organic compound contained in the liquid by emission of ultraviolet light irradiated from the excimer lamp.

5. A decomposition method as claimed in claim 4, wherein said organic compound is selected from flon, dioxin (polychlorinated dibenzo-para-dioxin), PCB (polychlorinated biphenyl), trichloroethylene, tetrachloroethylene, dichloromethane, tetrachloromethane, 1,2-dichloroethane, 1,1-dichloroethane, cis-1,2-dichloroethane, 1,1,1-trichloroethane, 1,3-dichloropropene and a mixture thereof.

6. A decomposition method as claimed in claim 4, wherein a wave length of the UV light is 222 nm or below.

* * * * *